(12) United States Patent
Castaneda et al.

(10) Patent No.: US 10,885,718 B2
(45) Date of Patent: *Jan. 5, 2021

(54) METHODS AND SYSTEMS FOR REPRESENTING A PRE-MODELED OBJECT WITHIN VIRTUAL REALITY DATA

(71) Applicant: Verizon Patent and Licensing Inc., Arlington, VA (US)

(72) Inventors: Oliver S. Castaneda, Rochester, NY (US); Liang Luo, Piscataway Township, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,998

(22) Filed: Nov. 20, 2019

(65) Prior Publication Data

US 2020/0090413 A1     Mar. 19, 2020

Related U.S. Application Data

(63) Continuation of application No. 16/004,305, filed on Jun. 8, 2018, now Pat. No. 10,521,963.

(51) Int. Cl.
*G06T 19/00* (2011.01)
*G06K 9/00* (2006.01)
(Continued)

(52) U.S. Cl.
CPC ........ *G06T 19/006* (2013.01); *G06K 9/00221* (2013.01); *G06K 9/00369* (2013.01);
(Continued)

(58) Field of Classification Search
CPC .......................... G06F 30/00; G06K 2209/01; G06K 9/00208; G06T 7/73; G06T 7/74;
(Continued)

(56) References Cited

U.S. PATENT DOCUMENTS

2015/0109409 A1*   4/2015   Isogai .................. H04N 13/128
                                                                          348/43
2015/0278579 A1*   10/2015   Saklatvala ........... G06K 9/4604
                                                                          382/203
(Continued)

*Primary Examiner* — Haixia Du

(57) ABSTRACT

An exemplary virtual reality system determines a first confidence metric representing an objective degree to which a pre-modeled object is recognized within a first captured image depicting a scene from a first vantage point. The virtual reality system also determines a second confidence metric representing an objective degree to which the pre-modeled object is recognized within a second captured image depicting the scene from a second vantage point distinct from the first vantage point. The virtual reality system then generates a rendered image that includes a depiction of the pre-modeled object from a third vantage point distinct from the first and second vantage points. The depiction of the pre-modeled object is generated based on data from the first and second captured images, the data prioritized for the depiction of the pre-modeled object according to relative magnitudes of the first and second confidence metrics. Corresponding methods and systems are also disclosed.

20 Claims, 15 Drawing Sheets

(51) Int. Cl.
  *G06T 7/246* (2017.01)
  *G06K 9/46* (2006.01)
  *G06T 15/50* (2011.01)
  *G06T 17/00* (2006.01)

(52) U.S. Cl.
  CPC .......... *G06K 9/00664* (2013.01); *G06K 9/46* (2013.01); *G06T 7/251* (2017.01); *G06T 15/503* (2013.01); *G06T 17/00* (2013.01); *G06K 2209/25* (2013.01); *G06T 2207/10016* (2013.01); *G06T 2207/20081* (2013.01)

(58) Field of Classification Search
  CPC .......... G06T 2207/30201; G06T 11/00; G06T 2207/20221; G06T 5/50; G06T 7/344; G06T 7/174; H04N 5/23219; H04N 13/239; H04N 7/181; H04N 13/111; H04N 13/117; H04N 13/243; H04N 13/282
  See application file for complete search history.

(56) References Cited

U.S. PATENT DOCUMENTS

| | | |
|---|---|---|
| 2015/0310613 A1 | 10/2015 | Murakami |
| 2016/0188959 A1 | 6/2016 | Matsunaga |
| 2018/0229656 A1* | 8/2018 | Yokota .................. G08G 1/168 |
| 2018/0284250 A1* | 10/2018 | Bjaerum .................. A61B 8/54 |

\* cited by examiner

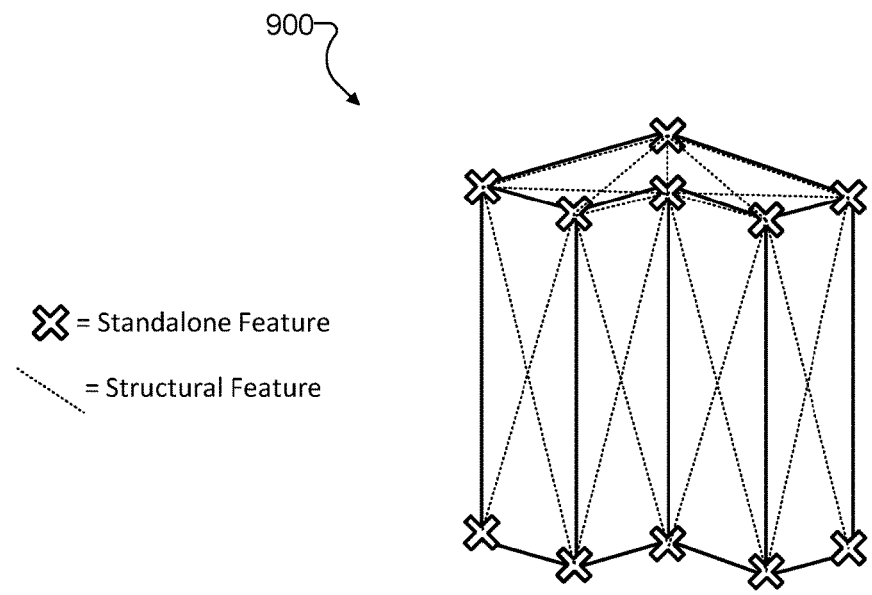
Fig. 9A
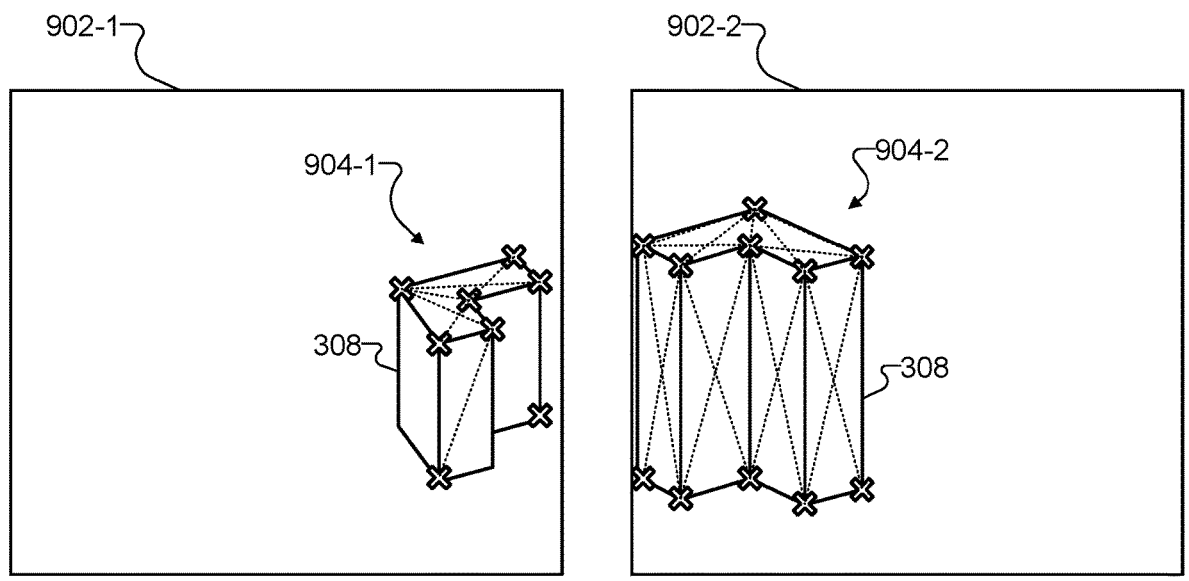
Fig. 9B   Fig. 9C

Confidence Metric Data

1000

1002-1 → Object 1

| Device | Confidence% |
|--------|-------------|
| 1 | 81% |
| 2 | 96% |
| 3 | 47% |
| 4 | — |
| 5 | — |
| 6 | — |
| 7 | — |
| 8 | — |

1002-2 → Object 2

| Device | Confidence% |
|--------|-------------|
| 1 | — |
| 2 | — |

Fig. 10

METHODS AND SYSTEMS FOR REPRESENTING A PRE-MODELED OBJECT WITHIN VIRTUAL REALITY DATA

RELATED APPLICATIONS

This application is a continuation application of U.S. patent application Ser. No. 16/004,305, filed Jun. 8, 2018, and entitled "Methods and Systems for Representing a Pre-modeled Object Within Virtual Reality Data," which is hereby incorporated by reference in its entirety.

BACKGROUND INFORMATION

Virtual reality technology allows users of virtual reality media player devices to experience virtual reality worlds. For example, virtual reality worlds may be implemented based on live, camera-captured scenery of a real-world scene to allow users to experience, in real time, real-world places that are difficult, inconvenient, expensive, or otherwise problematic for the users to experience in real life (i.e., in a non-simulated manner). Virtual reality technology may thus provide users with a variety of entertainment, educational, vocational, and/or other enjoyable or valuable experiences that may otherwise be difficult or inconvenient for the users to obtain.

In some examples, it may be desirable for a user to view a virtual reality world based on a real-world scene from a vantage point other than one of the vantage points from which real-time video footage of the real-world scene is being captured by physical capture devices (e.g., video cameras). As such, image data captured by different physical capture devices at different vantage points may be analyzed and combined to render new image data representative of depictions of the real-world scene from different vantage points (i.e., vantage points that do not align with the vantage point of any physical capture device).

Unfortunately, as footage from different capture devices is combined and processed in real time, inaccuracies may enter into resultant virtual reality data. For example, due to inconsistencies between data detected by different physical capture devices, as well as the significant challenge of performing large amounts of image processing in real time, rendered depictions of objects may become distorted, lost, replicated, moved, or otherwise reproduced inaccurately. Such inaccuracies may be distracting to users viewing these inconsistent depictions during virtual reality experiences, particularly when the objects depicted are familiar objects or are important to the virtual reality experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9A illustrates an exemplary preconfigured model of a pre-modeled object according to principles described herein.

FIGS. 9B and 9C illustrate captured images within which the virtual reality system of FIG. 1 recognizes the pre-modeled object of FIG. 3 according to principles described herein.

FIG. 10 illustrates exemplary confidence metric data for pre-modeled objects recognized in captured images according to principles described herein.

DETAILED DESCRIPTION OF PREFERRED EMBODIMENTS

Figure 1:
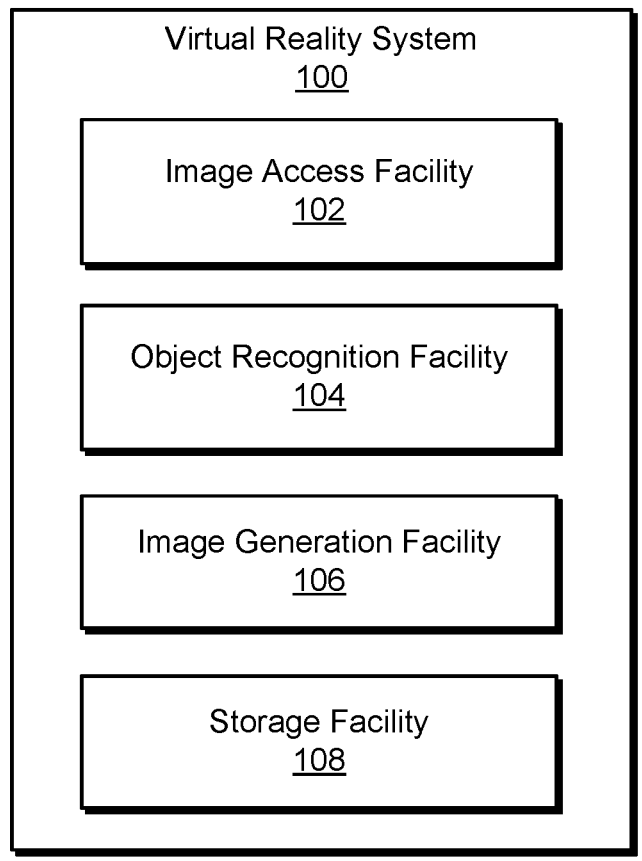
FIG. 1 illustrates an exemplary virtual reality system for accurately representing a pre-modeled object within virtual reality data according to principles described herein.

Methods and systems for representing a pre-modeled object within virtual reality data are described herein. For example, in certain implementations, a virtual reality system may access (e.g., receive, retrieve, load, transfer, etc.) a first image dataset and a second image dataset. An image dataset may be implemented by one or more files, data streams, and/or other types of data structures that contain data representative of an image (e.g., a two-dimensional image that has been captured or rendered in any of the ways described herein). The first image dataset accessed by the virtual reality system may be representative of a first captured image depicting a real-world scene from a first vantage point at a particular time, and the second image dataset may be representative of a second captured image depicting the real-world scene from a second vantage point distinct from the first vantage point at the particular time. These image datasets may be accessed from any suitable source, such as from a capture system that includes a plurality of capture devices (e.g., video cameras, etc.) that are disposed at different vantage points with respect to the real-world scene.

Based on the accessed first and second image datasets, the virtual reality system may recognize a pre-modeled object within both the first and second captured images. The pre-modeled object may be a familiar object and/or an object that plays an important role in ongoing events occurring within the real-world scene. For instance, if the real-world scene includes a sporting event such as a basketball game, the pre-modeled object may be a human body (e.g., belonging to a player, a referee, etc.), a human face, a company logo (e.g., included on an advertisement on the sideline), the basketball being used to play the game, or the like. As another example, if the real-world scene includes a musical event such as a rock concert, the pre-modeled object could be associated with one of the musicians (e.g., a body, a face, etc.), a particular instrument (e.g., a guitar, a piano keyboard, a drum set, etc.) used to make the music, and so forth.

Along with recognizing the pre-modeled object in the image datasets of both captured images, the virtual reality system may determine confidence metrics indicative of the certainty of the system that the pre-modeled object was accurately recognized in each of the image datasets. Specifically, the virtual reality system may determine a first confidence metric representative of an objective degree to which the virtual reality system accurately recognizes the pre-modeled object within the first captured image, and may determine a second confidence metric representative of an objective degree to which the virtual reality system accurately recognizes the pre-modeled object within the second captured image. The virtual reality system may then determine that one confidence metric is greater than the other (i.e., signifying that the pre-modeled object is recognized to an objectively higher degree in one image dataset than in another). For instance, in one example, the virtual reality system may determine that the second confidence metric is greater than the first confidence metric.

Based on the first and second image datasets, the virtual reality system may generate a third image dataset representative of a rendered image that includes a depiction of the pre-modeled object within the real-world scene at the particular time. For example, the rendered image of the third image dataset may represent a depiction of the pre-modeled object from a third vantage point that is distinct from both the first and second vantage points. The virtual reality system may generate this third image dataset by processing and combining data from each of the first and second image datasets. However, in doing so, the virtual reality system may prioritize one image dataset over another based on the determination of one confidence metric being greater than the other. For example, if it is determined that the second confidence metric is greater than the first confidence metric, the virtual reality system may generate the third image dataset by prioritizing the second image dataset over the first image dataset for the rendering of the pre-modeled object depiction. Additional details about how image datasets may be accessed, how pre-modeled objects may be recognized, how confidence metrics may be determined and compared, and how certain image datasets may be prioritized over others as new image datasets are rendered will all be described in more detail below.

Methods and systems for accurately representing a pre-modeled object within virtual reality data described herein may provide various advantages and benefits. For example, methods and systems described herein may significantly improve the accuracy and overall appearance of pre-modeled objects represented in depictions of real-world scenes within virtual reality data, particularly when those depictions are processed and rendered in real time.

Conventional rendering methods and systems do not differentiate pre-modeled objects from other objects, but rather treat all objects found in captured images equally. Unfortunately, while such conventional methods and systems may attempt to render all the objects as quickly and accurately as they can, inaccurate portions of the ultimate rendered images (e.g., lost portions, distorted portions, replicated portions, etc.) may arise, particularly when the system is rushed to keep up with a real-time processing requirement using limited computing power. Such inaccuracies may not be particularly problematic for many objects within a real-world scene, because many objects are not actively studied by users to the extent that the inaccurate reproductions are noticeable. For example, if a spot on a rug pattern is accidentally replicated in a few frames of video before being corrected, a user may not notice the inaccuracy at all. The situation may be different, however, for other types of objects that are more familiar and/or more important to the scene. For instance, if an eye on a human face is accidentally replicated for a few frames (i.e., resulting in a depiction of the face that includes three eyes rather than two), the user may immediately notice and be distracted by this inaccuracy.

The methods and systems described herein allow for pre-modeled objects such as faces, humans, logos, and other important or common objects found within real-world scenes to be differentiated and handled differently from other objects to improve the quality of the rendered images depicting these special objects. Specifically, as will be described and illustrated in more detail below, methods and systems described herein may determine which image data best represents a pre-modeled object (e.g., based on which capture device has the most optimal vantage point to capture the pre-modeled object), and may prioritize that image data over other image data that may disagree and cause inaccuracies to arise in the final rendering. Consequently, as compared to conventional methods and systems, methods and systems described herein may provide more accurate representations of objects that are important to reproduce faithfully with minimal extra processing and without requiring any additional processing resources, capture devices, or the like. Thus, real-time processing of a real-world scene may be performed employing the same technology in use today, but with higher quality results for the types of objects and images that are most noticed by users. Ultimately, these improvements lead to enhanced user experiences such as more immersive virtual reality experiences, fewer distractions, higher quality, and the like.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality system 100 ("system 100") for accurately representing a pre-modeled object within virtual reality data. As shown, system 100 may include, without limitation, an image access facility 102, an object recognition facility 104, an image generation facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, each of facilities 102 through 108 may be distributed between multiple devices and/or multiple locations as may serve a particular implementation.

In some examples, facilities 102 through 108 may be configured to operate in real-time so as to analyze and process image data and generate virtual reality data representing pre-modeled objects as fast as captured image data is being generated. As used herein, operations may be performed in "real time" when they are performed immediately and without undue delay such that, for example, data processing operations associated with an ongoing event (e.g., a real-world sporting event, concert, etc.) are performed while the event is still ongoing (i.e., rather than after the fact) even if there is some amount of delay such as a few seconds or minutes. In some examples, these types of real-time operations may allow virtual reality users to experience a real-world event live or at approximately the same time as people actually attending the event.

Each of facilities 102 through 108 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility, or may be implemented using shared computing components. As will be described in more detail below, each of facilities 102 through 108 may be implemented on either a server-side virtual reality provider system or on a client-side virtual reality client system (e.g., a media player device). Each of facilities 102 through 108 will now be described in more detail.

Image access facility 102 may be configured to perform various operations associated with accessing image datasets (i.e., data files, data streams, etc., that represent a particular image) for analyzing and processing by system 100. For example, image access facility 102 may be configured to access a first image dataset representative of a first captured image depicting a real-world scene from a first vantage point at a particular time, as well as to access a second image dataset representative of a second captured image depicting the real-world scene from a second vantage point distinct from the first vantage point at the particular time.

The accessed image datasets may be captured synchronously with one another such that the first and second image datasets each represent images depicting the real-world scene at the same particular time. It will be understood that the image datasets captured by image access facility 102 may each be included within respective image sequences (e.g., captured video sequences) corresponding to different vantage points at which capture devices are disposed with respect to the real-world scene (e.g., including the first and second vantage points). As such, image access facility 102 may access the image datasets and/or image sequences from systems external to system 100 (e.g., by requesting and receiving the image datasets or image sequences). In other examples, image access facility 102 may access the image datasets and/or image sequences from other facilities included within system 100 (e.g., including facilities not explicitly shown in FIG. 1).

Object recognition facility 104 may be configured to perform various operations associated with recognizing one or more pre-modeled objects within the image datasets accessed by image access facility 102. For example, object recognition facility 104 may be configured to recognize, based on the first and second image datasets accessed by image access facility 102, a pre-modeled object within both the first and second captured images. The pre-modeled object recognized within both of the captured images may be any of the pre-modeled objects described herein or any other suitable object that may be associated with a preconfigured model configured to allow object recognition facility 106 to fit images to the preconfigured model to attempt to recognize the object.

Object recognition facility 104 may further be configured to determine a first confidence metric representative of an objective degree to which object recognition facility 104 accurately recognizes the pre-modeled object within the first captured image, and to determine a second confidence metric representative of an objective degree to which object recognition facility 104 accurately recognizes the pre-modeled object within the second captured image. Additionally, object recognition facility 104 may further be configured to determine which confidence metric is the greatest out of a plurality of confidence metrics that may be determined for a plurality of image datasets accessed. For instance, object recognition facility 104 could determine that the second confidence metric is greater than the first confidence metric, thus signifying that the second image dataset is to be considered superior to the first image dataset for representing the pre-modeled object. Various ways of recognizing a pre-modeled object within an image and determining a confidence metric representative of an objective degree to which the pre-modeled object is accurately recognized within the image will be described in more detail below.

Image generation facility 106 may be configured to generate (i.e., render) additional image datasets based on the image datasets representative of the captured images. Specifically, based on the first and second image datasets, image generation facility 106 may generate a third image dataset representative of a rendered image that includes a depiction of the pre-modeled object within the real-world scene at the particular time from a third vantage point distinct from the first and second vantage points. Based on the determination of object recognition facility 104 of which image dataset contains the superior data for the pre-modeled object, image generation facility 106 may perform this generating by prioritizing certain image data over other image data for the depiction of the pre-modeled object. Specifically, for instance, in the example in which object recognition facility 106 determines that the second confidence metric is greater than the first confidence metric, image generation facility 106 may perform the generating of the third image dataset by prioritizing the second image dataset over the first image dataset for the depiction of the pre-modeled object within the real-world scene. Various ways of generating additional image datasets, and for prioritizing some data over other data in doing so, will be described in more detail below.

Storage facility 108 may maintain any suitable data received, generated, managed, analyzed, maintained, used, and/or transmitted by facilities 102 through 106 in a particular implementation. For example, storage facility 108 may include raw (e.g., captured) or processed (e.g., rendered) image datasets, image sequence data, preconfigured models of pre-modeled objects, confidence metric data, or the like. Additionally, storage facility 108 may include program instructions and/or other data used by facilities 102 through 106 in performing the operations described herein.

Figure 2:
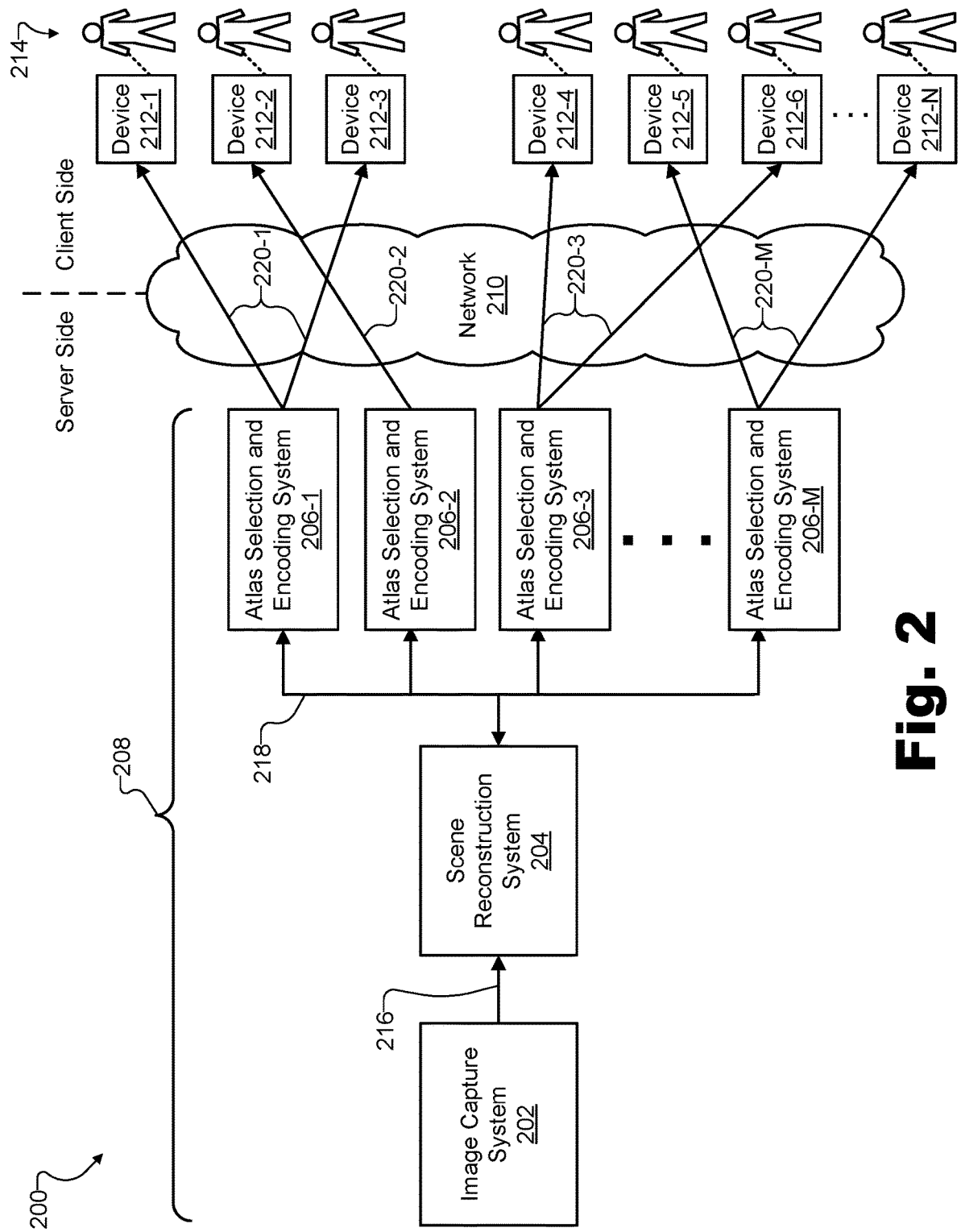
FIG. 2 illustrates an exemplary configuration in which the virtual reality system of FIG. 1 may operate to accurately represent a pre-modeled object within virtual reality data according to principles described herein.

FIG. 2 illustrates an exemplary configuration 200 in which system 100 may operate to accurately represent a pre-modeled object within virtual reality data. Specifically, configuration 200 includes an image capture system 202, a scene reconstruction system 204, and a plurality of atlas selection and encoding systems 206 (e.g., "atlas systems" 206-1 through 206-M). As shown, image capture system 202, scene reconstruction system 204, and atlas systems 206 may be selectively and communicatively coupled to one another. Collectively, image capture system 202, scene reconstruction system 204, and the plurality of atlas systems 206 may form an exemplary virtual reality provider system 208. Virtual reality provider system 208 may further be communicatively coupled, by way of a network 210, to a plurality of media player devices 212 (e.g., media player devices 212-1 through 212-N) associated with a plurality of users 214.

As illustrated in FIG. 2, a server-client approach may be employed in configuration 200 for virtual reality data to be generated by and provided from a server side of network 210, and to be received by and consumed on a client side of network 210. On the server side, configuration 200 illustrates a pipeline approach for generating data. Specifically, raw video data is captured by image capture system 202, and then is processed and passed along by scene reconstruction system 204 and atlas systems 206. In some examples, additional or fewer components may be included in the pipeline than illustrated in configuration 200 and explicitly described herein. It will be understood that each of the components of the pipeline illustrated in configuration 200 may be implemented using computer hardware and software in any suitable manner. For instance, each separate box illustrated in configuration 200 may represent a different computing device or group of devices (e.g., a different server computer or group of servers), a different chip (e.g., processor) within a single physical computing device, a different software thread or process, or the like. Conversely, different elements may be merged and combined in any manner as may serve a particular implementation.

System 100 may be implemented within configuration 200 in various ways and/or as part of various systems and/or devices shown in FIG. 2. For example, as will be described in more detail below, rendering aspects of system 100 may be implemented by one or more 3D rendering engines included within scene reconstruction system 204 or by similar rendering engines built into media player devices 212. As another example, atlas selection aspects of system 100 may be built into any or each of atlas systems 206. Each of the elements represented in configuration 200 will now be described in more detail, including how various aspects of system 100 may be implemented by these elements. As will be set forth in detail below, various elements that are illustrated at a relatively high level of abstraction in configuration 200 will be described with more particularity in reference to additional illustrations.

Image capture system 202 may be configured to capture image datasets (e.g., sequences of image datasets). In certain examples, a virtual reality world may be generated based on camera-captured footage of real-world scenery. As such, image capture system 202 may include or be communicatively coupled with a plurality of capture devices (e.g., video cameras, depth imaging devices, etc.) configured to capture images for processing and distribution by image capture system 202.

Figure 3:
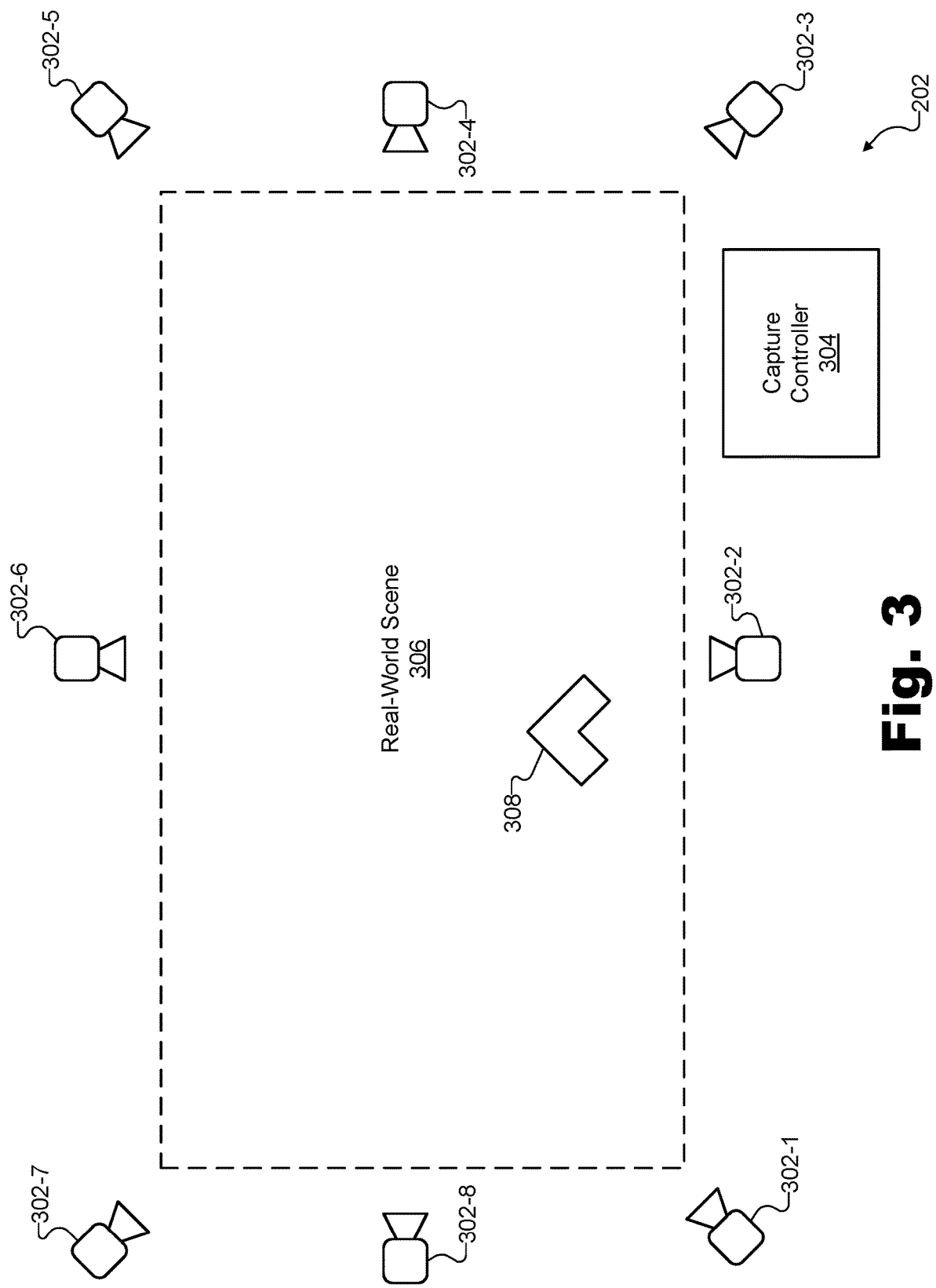
FIG. 3 illustrates an exemplary implementation of an image capture system used to capture video content representative of a real-world scene according to principles described herein.

To illustrate, FIG. 3 shows an exemplary implementation of image capture system 202 configured to capture video content representative of a real-world scene. Specifically, the implementation of image capture system 202 illustrated in FIG. 3 includes a plurality of capture devices 302 (e.g., capture devices 302-1 through 302-8) that may be selectively and communicatively coupled to one another and to a capture controller 304 (connections not explicitly shown).

In some examples, each capture device 302 may be configured to capture both color data and depth data, or may include separate devices for capturing these different types of data. As shown, capture devices 302 may be disposed at different positions around a real-world scene 306 that includes a pre-modeled object 308. As such, each capture device 302 may capture respective image datasets representative of real-world scene 306 and pre-modeled object 308 from a vantage point associated with the respective position of the capture device 302.

Capture controller 304 may receive images captured by each of capture devices 302 and may manage (e.g., buffer, aggregate, synchronize, etc.) the images to prepare image sequences (i.e., video data) that may be provided to downstream systems in the pipeline such as scene reconstruction system 204.

Real-world scene 306 may represent any type of scene as may serve a particular implementation. For example, real-world scene 306 may represent any real-world indoor or outdoor location, event, landscape, structure, or the like. As illustrated by the dashed box encompassing real-world scene 306, real-world scene 306 may be a specifically delineated area such as a stage, an arena, a room, or the like. Conversely, in other examples, real-world scene 306 may not be so well defined or delineated.

Pre-modeled object 308 may represent any real-world pre-modeled object that is associated with (e.g., located within or around) real-world scene 306. For example, while pre-modeled object 308 is drawn as a relatively simple geometric shape for the sake of clarity, it will be understood that pre-modeled object 308 may represent any of the pre-modeled objects described herein or any other suitable pre-modeled object characterized by any particular level of complexity. Rather than a geometric shape, for instance, pre-modeled object 308 could be a human face, a human body, an image of a product logo (e.g., included on a T-shirt or an advertisement), or the like.

Returning to FIG. 2, image capture system 202 is shown to provide image data 216 to scene reconstruction system 204. For example, image data 216 may include individual image datasets, synchronized sequences of image datasets, metadata, and/or any other data captured and/or generated by image capture system 202. The role of scene reconstruction system 204 may then be to receive and process image data 216 to generate a full atlas frame sequence 218. For instance, scene reconstruction system 204 may be configured to generate datasets representative of various image sequences that together constitute full atlas frame sequence 218 by generating (e.g., based on a volumetric representation constructed based on camera-captured footage of real-world scene 306 and maintained by scene reconstruction system 204) each image sequence from a particular vantage point associated with each image sequence. As will be described in more detail below, scene reconstruction system 204 may then be configured to provide the image sequence data in full atlas frame sequence 218 to atlas systems 206 to be divided into different partial atlas frame sequences 220 (i.e., partial atlas frame sequences 220-1 through 220-M) and encoded for transmission to media player devices 212 by way of network 210.

Figure 4:
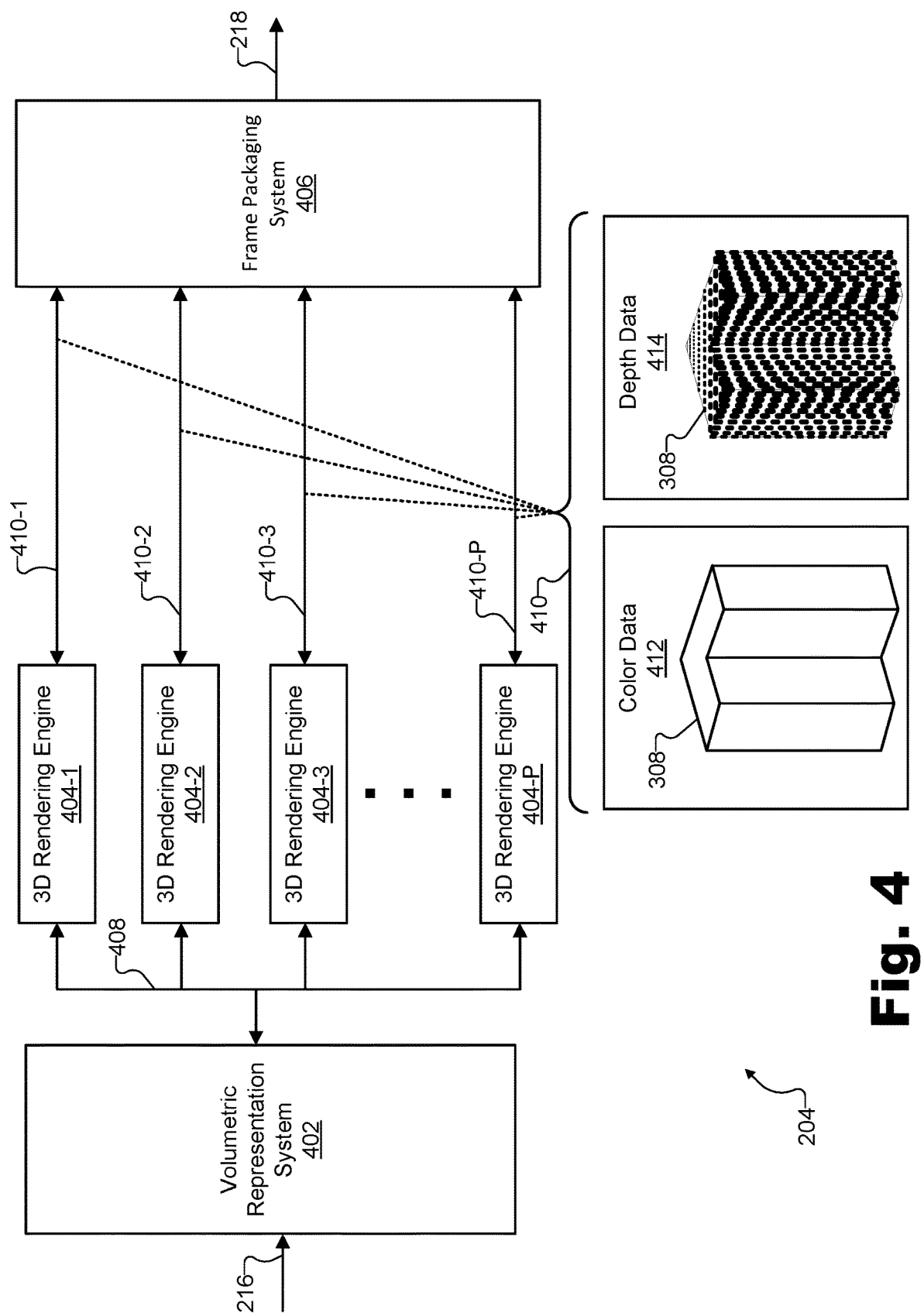
FIG. 4 illustrates an exemplary implementation of a scene reconstruction system according to principles described herein.

FIG. 4 shows an exemplary implementation of scene reconstruction system 204. For example, the implementation in FIG. 4 includes a volumetric representation system 402, a plurality of three-dimensional ("3D") rendering engines 404 (e.g., 3D rendering engines 404-1 through 404-P), and a frame packaging system 406.

Volumetric representation system 402 may receive image data 216 from image capture system 202, and may be configured to manage a volumetric representation of real-world scene 306 and objects included therein (e.g., including pre-modeled object 308) based on image data 216. In some examples, the volumetric representation managed by volumetric representation system 402 may be dynamically changing (e.g., by behavior of the objects included within the volumetric representation, by interactions with users experiencing a virtual reality world associated with the volumetric representation, etc.). As such, volumetric representation system 402 may track the current state of the volumetric representation in light of the dynamic changes.

Volumetric representation system 402 may generate volumetric representation data 408 representative of the state of the volumetric representation being managed and tracked by volumetric representation system 402. For example, volumetric representation data 408 may take the form of a plurality of volumetric representation frames (e.g., key frames, update frames, etc.) that may each be provided to each of 3D rendering engines 404. In some examples, volumetric representation data 408 may include image datasets representative of captured images accessed from capture devices 302 (e.g., accessed from image capture system 202 by way of capture controller 304), and/or may include links to an asset storage system (not explicitly shown in FIG. 4) where such image datasets and/or other detailed information (e.g., binary data representative of virtual object geometries, textures, etc.) may be stored.

Each 3D rendering engine 404 may be associated with a different vantage point with respect to the volumetric representation managed by volumetric representation system 402 (i.e., a different vantage point with respect to real-world scene 306). Different types of vantage points with which each 3D rendering engine 404 may be associated will be described in more detail below. Each of 3D rendering engines 404 may be configured to render at least one image sequence 410 (e.g., image sequences 410-1 through 410-P) depicting real-world scene 306 from the respective vantage point with which the 3D rendering engine 404 is associated. Each image sequence 410 may be comprised of a sequence of image datasets each representative of a sequential captured image depicting real-world scene 306 at a sequential moment in time, such that the image sequence is essentially composed of a plurality of images or frames making up a video that captures real-world scene 306 from a particular vantage point over a particular time period.

Besides being associated with different vantage points, different image sequences 410 rendered by different 3D rendering engines 404 may also include different types of data. For example, different image sequences 410 illustrated in FIG. 4 may be implemented as color data image sequences, as depth data image sequences, or as combinations of both color and depth data image sequences. In some examples, image sequences 410 may further include metadata or other information as may serve a particular implementation.

To illustrate exemplary color and depth data images that may be included within image sequences 410, FIG. 4 depicts an exemplary color data image 412 and an exemplary depth data image 414. For example, color data image 412 and depth data image 414 may both represent pre-modeled object 308 from a perspective vantage point positioned directly in front of pre-modeled object 308, as will be described in more detail below.

As used herein, "color data" may broadly include any image data, video data, or the like, whether represented in color or grayscale (i.e., "black and white"), that represents how a subject (e.g., an object included within a virtual reality world) may appear at a particular point in a time sequence or over a particular time period from the vantage point. Color data is not limited to any particular format, file type, frame rate, resolution, quality level, or other characteristic that may be associated with various definitions and/or standards defining image data and/or video data in the art. As such, color data image 412 may be captured, formatted, transmitted, and represented in any suitable form. For example, color data image 412 may be represented by digital data that is formatted according to a standard image format.

Similarly, as used herein, "depth data" may include any data representative of a position of a subject in space. For example, depth data image 414 may depict another view of the volumetric representation managed by volumetric representation system 402 (e.g., another view of real-world scene 306) from the same vantage point as color data 412. However, rather than depicting the visible appearance of pre-modeled object 308 (i.e., representing in color or grayscale how light interacts with the surfaces of pre-modeled object 308), depth data image 414 may depict the depth (i.e., the distance or position) of each point on the surface of pre-modeled object 308 with respect to the vantage point.

As with color data image 412, depth data image 414 may be captured, formatted, transmitted, and represented in any suitable form. For example, as shown, depth data image 414 may be depicted using grayscale image data (e.g., six or eight bits for each pixel included within depth data image 414). However, rather than representing how visible light reflects from the surfaces of pre-modeled object 308 (as represented in color data image 412), the grayscale image of depth data image 414 may depict, for each pixel in the image, how far away the point represented by that pixel is from the vantage point. For example, points that are closer to the vantage point may be represented with values that represent darker shades of gray (e.g., binary values closer to 0b111111 in the case of a six-bit implementation where 0b111111 represents black). Conversely, points that are farther away from the vantage point may be represented with values that represent lighter shades of gray (e.g., binary values closer to 0b000000 in the case of the six-bit implementation where 0b000000 represents white).

After being rendered by 3D rendering engines 404, image frame sequences 410 may be provided to frame packaging system 406, which may organize, synchronize, combine, and/or otherwise process the surface data frames to generate a full atlas frame sequence 218, which will be described in more detail below.

As image datasets are rendered by each of 3D rendering engines 404 for inclusion within image sequences 410, 3D rendering engines 404 may employ respective implementations of system 100 to accurately represent pre-modeled objects within the image datasets generated by 3D rendering engines 404. Specifically, as each 3D rendering engine 404 combines data from different captured image datasets included (or linked to) within volumetric representation data 408, representations of pre-modeled objects such as pre-modeled object 308 may be rendered differently than representations of other objects included within real-world scene 306. In particular, data captured from preferred vantage points for each pre-modeled object may be prioritized over data captured from less-preferred vantage points in order to produce accurate depictions of the pre-modeled objects and avoid inaccuracies (e.g., omissions, distortions, replications, etc.) that may enter into an object representation when data from preferred vantage points is not prioritized.

Figure 5A:
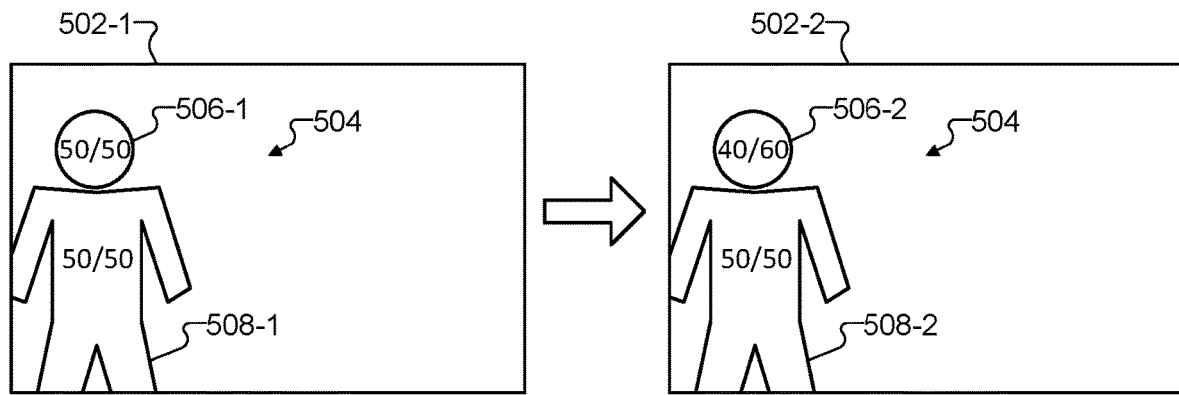
FIGS. 5A and 5B illustrate exemplary ways of prioritizing image data captured from one vantage point over image data captured from another vantage point according to principles described herein.
Figure 5B:
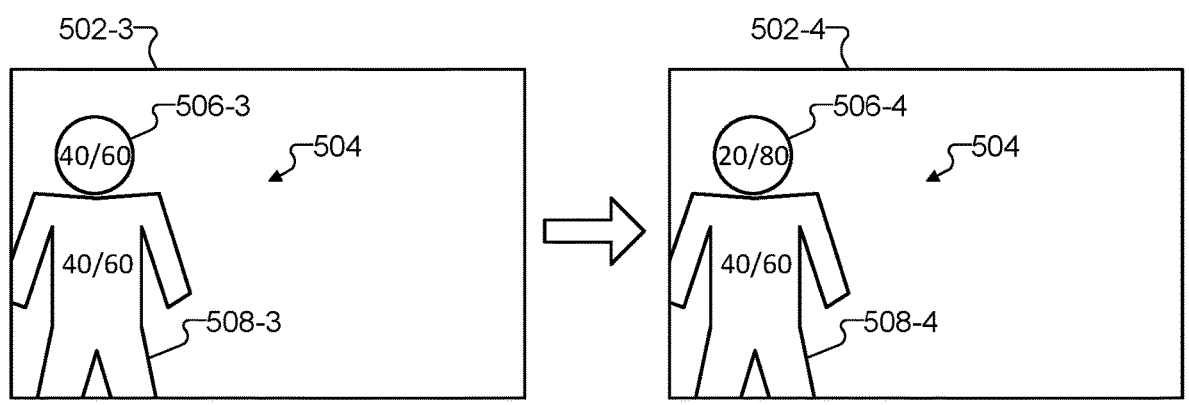

To illustrate, FIGS. 5A and 5B show exemplary ways of prioritizing image data captured from one vantage point (e.g., a preferred vantage point) over image data captured from another vantage point. Specifically, FIGS. 5A and 5B illustrate differences between weighted color blending techniques in which image data is prioritized in accordance with methods and systems described herein and conventional color blending techniques in which image data from a preferred vantage point is not prioritized.

In the examples of FIGS. 5A and 5B, a plurality of rendered images 502 (i.e., rendered images 502-1 through 502-4) are shown depicting a real-world scene within which a person 504 is located. As will be described in more detail below, the rendered images 502 on the left side of each arrow (i.e., rendered images 502-1 in FIG. 5A and 502-3 in FIG. 5B) represent conventionally rendered images that do not prioritize image data in rendering a pre-modeled object, while the rendered images 502 on the right side of each arrow (i.e., rendered images 502-2 in FIG. 5A and 502-4 in FIG. 5B) represent rendered images that do prioritize image data for pre-modeled object representations in accordance with the methods and systems described herein.

In these examples, the pre-modeled object in question is a face of person 504. The body of person 504, however, is not a pre-modeled object in this example, thus allowing FIGS. 5A and 5B to highlight how the rendering of a pre-modeled object is performed differently than the rendering of other objects when data is prioritized in accordance with principles described herein. In each of rendered images 502, it will be understood that both a face depiction 506 (e.g., a face depiction 506-1 through 506-4) and a body depiction 508 (e.g., a body depiction 508-1 through 508-4) may be rendered based on data from two image datasets associated with two captured images.

In FIG. 5A, a conventional rendered image 502-1 may include face depiction 506-1 and body depiction 508-1 of person 504 that are both equally weighted with color data from both the first and second image datasets (i.e., notated in rendered image 502-1 as "50/50" color blending for both face depiction 506-1 and body depiction 508-1). In other words, in generating color data for each pixel depicting both the face and body of person 504 in rendered image 502-1, the conventional color blending technique may be configured to determine the color as an equal blend of color data associated with the corresponding pixel from data captured by both a first and a second capture device.

This contrasts with rendered image 502-2, in which image data from the second image dataset (i.e., image data captured by the second capture device) is prioritized for face depiction 506-2 due to the face of person 504 being a pre-modeled object, while the image data is still weighted equally for body depiction 508-2 due to the body of person 504 not being a pre-modeled object. Specifically, as shown, the color blending for face depiction 506-2 is indicated to be "40/60" (i.e., giving image data from the second image dataset 60% weight as compared to the 40% weight given to image data from the first image dataset), while the color blending for body depiction 508-2 is still "50/50" (i.e., equal weighting, the same as was done in the conventional example of rendered image 502-1).

Accordingly, in this example, an implementation of system 100 (e.g., an implementation included within a 3D rendering engine 404 configured to generate rendered images 502) may be configured to generate, based on first and second image datasets representative of captured images, a third image dataset representative of rendered image 502-2 that includes the depiction of the pre-modeled object (i.e., the face of person 504) within the real-world scene from a different vantage point than was used by either of the capture devices that captured the first and second image datasets. In generating the third image dataset representative of rendered image 502-2, system 100 is shown to have prioritized (e.g., based on a prior determination that the second image dataset is preferred over the first image dataset, as will be described in more detail below) the second image dataset over the first image dataset for a depiction of the pre-modeled object within the real-world scene. Additionally, system 100 is shown to have abstained from prioritizing the second image dataset over the first image dataset for a depiction of an additional object within the real-world scene that is also included in rendered image 502 along with the depiction of the pre-modeled object. That is, system 100 is shown to have prioritized the second image dataset for face depiction 506-2 while abstaining from prioritizing the second image dataset for body depiction 508-2.

While FIG. 5A illustrates that image data may be prioritized in certain examples by giving greater weight to one image dataset than to another, it will be understood that giving this greater weight may not be the only possible way to prioritize data and, indeed, may not even constitute prioritizing image data in certain examples. For instance, as shown in FIG. 5B, a conventional rendered image 502-3 may employ weighted color blending to face depiction 506-3 and body depiction 508-3 for reasons that have nothing to do with any part of person 504 being recognized as a pre-modeled object. Instead, the vantage point associated with rendered images 502 may be closer to a vantage point associated with the second image dataset than to a vantage point associated with the first image dataset, and the default weighting may simply be "40/60" for both face depiction 506-3 and body depiction 508-3 regardless of what types of objects they are. Accordingly, in the example of FIG. 5B, prioritizing image data from the second image dataset over image data from the first image dataset may not be considered to have been performed merely as a result of the second image dataset being weighted more heavily than the first image dataset.

Rather, as shown in rendered image 502-4, image data may be considered to be prioritized in this example when face depiction 506-4 is generated using an even higher emphasis on the image data from the second image dataset (i.e., "20/80") than the default, or than depictions of other non-pre-modeled objects such as body depiction 508-4 use (i.e., "40/60"). In other words, image data may be considered to be prioritized when the pre-modeled object is differentiated from and treated distinctly from other objects in the scene.

It will be understood that the percentages and color blending techniques described with respect to FIGS. 5A and 5B are exemplary only. In other examples, image data may be prioritized for pre-modeled objects to any degree and in any manner as may serve a particular implementation. For instance, in certain examples, image data may be prioritized by using exclusively the image data from one image dataset while ignoring the image data from another image dataset (i.e., a 0/100 color blending).

Additionally, it will be understood that while the examples described herein have specifically described blending techniques for color data, depth data may also be processed in a similar manner as color data, or in any other suitable manner as may serve a particular implementation. For instance, if depth data is implemented so as to not be readily blendable in the same manner as described above for color data, depth data captured from a preferred vantage point may be used exclusively rather than depth data captured from a non-preferred vantage point (i.e., analogous to the 0/100 color blending technique described above). As another example, generalized depth data for a model of a pre-modeled object may be substituted, in certain examples, for captured depth data. For instance, a generalized depth map of a human face may be mapped onto control points and used rather than captured data for a human face pre-modeled object.

By differentiating pre-modeled objects from other objects depicted in a scene in these ways, system 100 may accurately represent the pre-modeled object within virtual reality data that is generated and eventually displayed for a user. As described above, this representation of the pre-modeled object may be visually superior and beneficial to the system and the user experiencing a virtual reality world by way of the virtual reality data.

Figure 6:
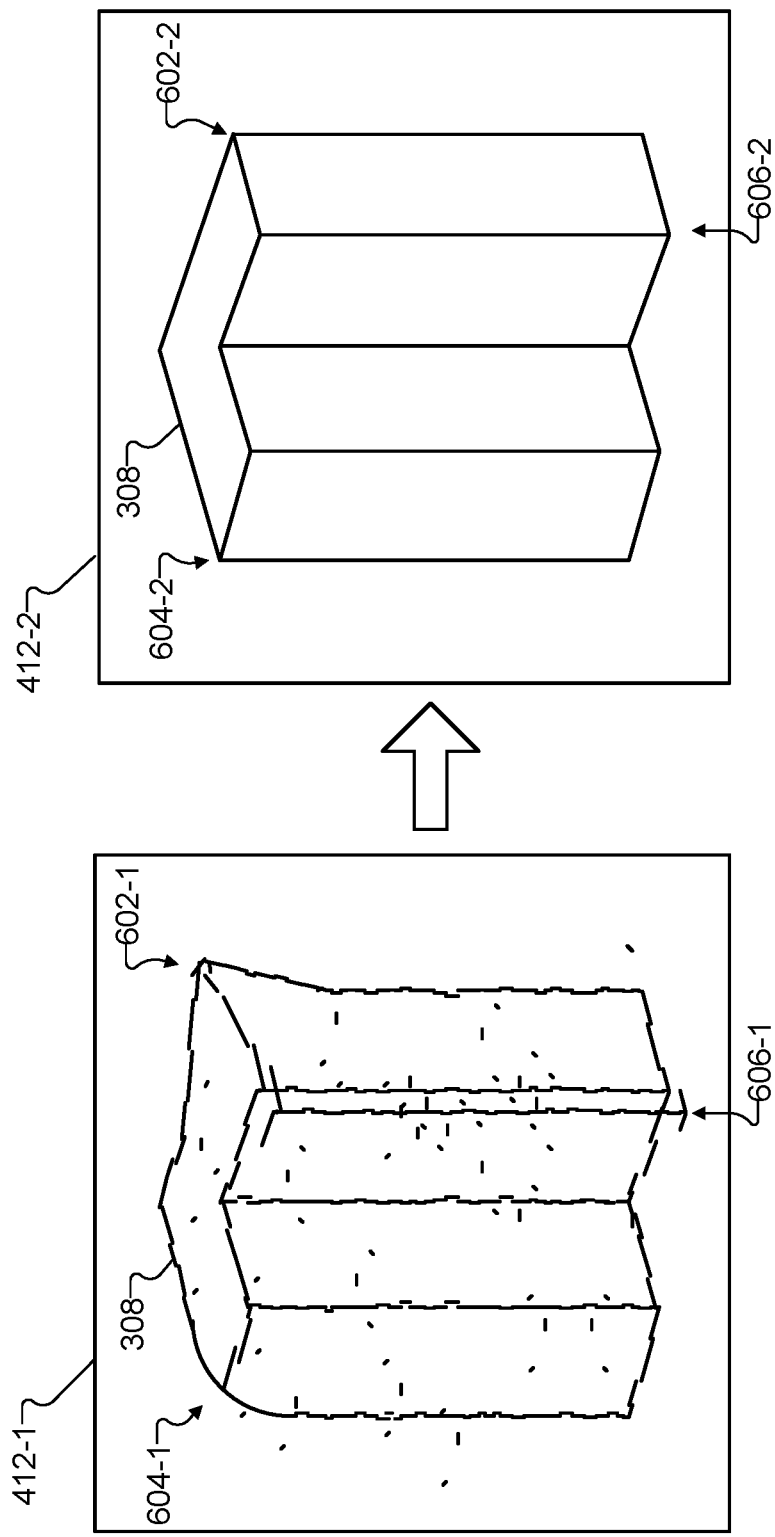
FIG. 6 illustrates an exemplary improvement to a rendered depiction of a pre-modeled object that may be brought about by methods and systems described herein.

To illustrate, FIG. 6 shows an exemplary improvement to a rendered depiction of pre-modeled object 308 that may be brought about by methods and systems described herein. As shown in FIG. 6, two versions of a color data image 412 (i.e., color data image 412-1 and 412-2) are illustrated to contrast how color data image 412 may appear when conventional color blending is employed and when color blending in accordance with the methods and systems described herein is employed. Specifically, color data image 412-1 represents an exemplary potential color data image that may be generated by one of 3D rendering engines 404 if image data from preferred vantage points is not prioritized. As shown, color data image 412-1 depicts pre-modeled object 308, but one corner 602-1 appears to be warped and distorted (e.g., stretched), another corner 604-1 appears to be omitted, and an edge 606-1 appears to be erroneously replicated. While the depiction of pre-modeled object 308 may be recognizable to a user viewing virtual reality content based on color data image 412-1, these deficiencies may be distracting or unappealing to the user, and may detract from the overall virtual reality experience.

In contrast, color data image 412-2 represents an exemplary potential color data image that may be generated by one of 3D rendering engines 404 if system 100 is implemented within the 3D rendering engine (i.e., such that image data captured from a preferred vantage point is prioritized over other image data). As shown, color data image 412-2 depicts pre-modeled object 308, and, in contrast with the depiction in color data image 412-1, includes a clean depiction of a corner 602-2 (corresponding to the omitted corner 602-1), an undistorted depiction of a corner 604-2 (corresponding to the warped and distorted corner 604-1), and an unreplicated edge 606-2 (corresponding to the replicated edge 606-1). Accordingly, as shown, the depiction of pre-modeled object 308 may not only be recognizable to a user viewing virtual reality content based on color data image 412-2, but may be a much more true representation of pre-modeled object 308 than the depiction in color data image 412-1. As such, the user may enjoy a higher quality and more immersive and enjoyable virtual reality experience.

As described above, scene reconstruction system 204 may be configured to take in captured image data from certain vantage points (i.e., vantage points to which physical capture devices 302 correspond) and to generate rendered image data from these and/or other vantage points (e.g., including vantage points to which no physical capture devices 302 correspond). Specifically, as described above, each 3D rendering engine within scene reconstruction system 204 may be associated with a particular vantage point and may be configured to render image datasets representative of captured images depicting real-world scene 306 from that particular vantage point.

As used herein, a vantage point from which an image (e.g., a color image or a depth image) is captured, depicted, represented, or the like, may define various aspects of how the image is captured, depicted, represented, and so forth, and how the image relates to the real-world scene and objects included therein. For example, the vantage point may define whether an image (or image sequence) is taken from a perspective of a particular point in space (and, if so, where that point in space is, what direction or orientation from that point in space the image represents, etc.) or whether the image is taken orthographically.

An orthographic vantage point may refer to a vantage point from which a rendering or other projection of color data and/or depth data may be generated orthographically. In other words, this may refer to a projection in which 3D surfaces of 3D objects are projected onto a two-dimensional projection plane by means of a parallel projection in which projection lines are all orthogonal to the projection plane. Orthographic projections obtained using orthographic vantage points may be beneficial in various implementations for a variety of reasons. For example, as compared to perspective projections, orthographic projections may have reduced overlap and, thus, reduced data redundancy. Additionally, orthographic projections may facilitate a uniform segmentation of a real-world scene into rectangular cells, whereas frustum bounds associated with perspective projections may make perspective projections more complicated and/or difficult to align. Additionally, fewer orthographic projections may be used to uniformly sample a rectangular volume as compared to a number of perspective projections used to uniformly sample the same volume.

Vantage points, as used herein, may also further define other aspects of how image sequences and/or images are captured, depicted, and represented. For example, a vantage point may define a particular resolution used to capture and represent an image, a field of view or zoom factor with which an image is captured and/or represented, and so forth. As a result, it will be understood that, as used herein, corresponding color and depth image datasets that are depicted from the same vantage point may depict substantially identical subject matter, albeit using different types of data (i.e., color data versus depth data, as will be described in more detail below).

Figure 7:
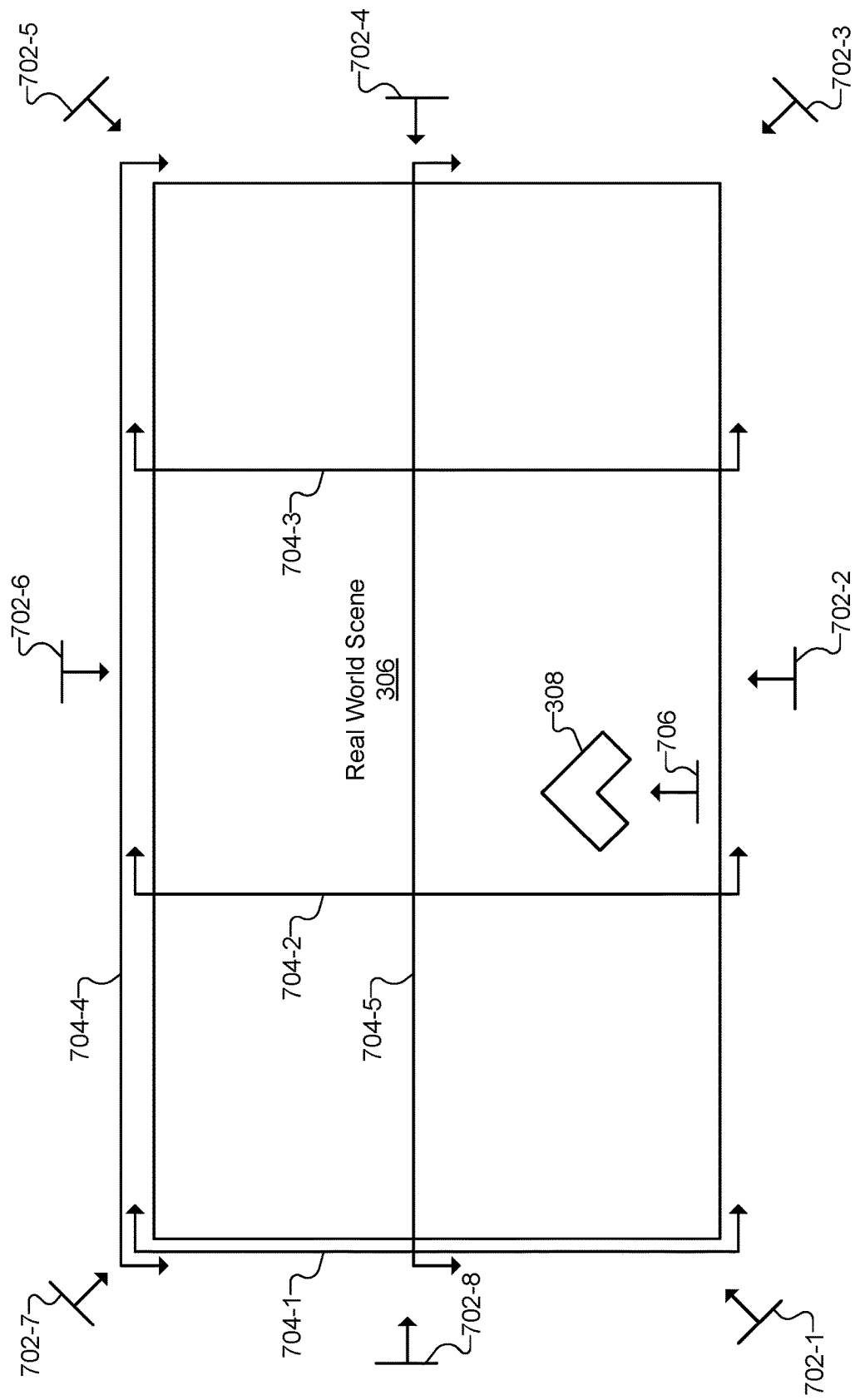
FIGS. 7 and 8 illustrate various exemplary vantage points from which images of the real-world scene of FIG. 3 may be depicted according to principles described herein.

To illustrate exemplary vantage points, FIG. 7 shows various exemplary vantage points from which real-world scene 306 may be depicted as virtual reality data is generated to create a virtual reality world based on real-world scene 306. For instance, FIG. 7 illustrates a plurality of perspective vantage points 702 (e.g., vantage points 702-1 through 702-8) and a plurality of orthographic vantage points 704 (e.g., vantage points 704-1 through 704-5) from which images and/or image sequences depicting real-world scene 306 (including pre-modeled object 308) may be generated.

As shown, each perspective vantage point 702 may be represented in FIG. 7 with an arrow symbol disposed at a particular location with respect to real-world scene 306 (i.e., a location from which the vantage point provides a perspective) and pointing in a general direction representative of the orientation of the vantage point (i.e., the general direction of the field of view associated with the vantage point). Conversely, orthographic vantage points 704 are represented in FIG. 7 as longer lines having arrows at either side to suggest the non-perspective, orthographic nature of these vantage points.

As shown in FIG. 7, each of perspective vantage points 702-1 through 702-8 may correspond to a position of a respective capture device 302. Specifically, perspective vantage point 702-1 may correspond to a position of capture device 302-1, perspective vantage point 702-2 may correspond to a position of capture device 302-2, and so forth. As such, the fixed positions at which vantage points 702 are disposed in this example are shown to surround real-world scene 306 along at least two dimensions associated with real-world scene 306 (e.g., along a ground plane). In some examples, vantage points 702 may further surround real-world scene 306 along three dimensions (e.g., by further including vantage points 702 above and below real-world scene 306).

Because vantage points 702 are each disposed at positions corresponding to specific capture devices 302, image datasets captured from each of vantage points 702 may be captured or generated exclusively by the capture device 302 corresponding to each of these vantage points. For example, image data captured exclusively by capture device 302-1 may be used to generate an image dataset representative of a rendered image depicting real-world scene 306 from vantage point 702-1, image data captured exclusively by capture device 302-2 may be used to generate an image dataset representative of a rendered image depicting real-world scene 306 from vantage point 702-2, and so forth.

However, as described above, for vantage points that do not align with any particular capture device 302 (i.e., vantage points other than vantage points 702), image data captured by more than one capture device 302 may be combined to generate an image dataset representative of a rendered image depicting real-world scene 306 from such vantage points. As such, these vantage points may be referred to herein as "non-aligned vantage points" or "virtual vantage points."

Orthographic vantage points 704 may be examples of virtual vantage points because image datasets associated with each orthographic vantage point 704 may be generated using data captured by a plurality of capture devices 302. Moreover, non-aligned perspective vantage points (i.e., perspective vantage points other than vantage points 702) may be employed to provide various views of real-world scene 306 other than the views provided by the positions at which physical capture devices 302 happen to be disposed.

For instance, one example of a non-aligned perspective vantage point is illustrated in FIG. 7 as a vantage point 706. As will be described in more detail below, image datasets representative of images depicting real-world scene 306 from vantage point 706 may be provided within virtual reality data in a similar way as image datasets representative of images depicting real-world scene 306 from vantage points corresponding to physical capture devices (i.e., vantage points 702). However, whereas image datasets captured from vantage points 702 may be generated based on image data captured by only one capture devices 302, image datasets captured from virtual vantage points such as vantage point 706 may be generated based on image data captured by a plurality of capture devices 302.

While only one non-aligned perspective vantage point is illustrated in FIG. 7 (i.e., vantage point 706), it will be understood that many such vantage points may be employed in certain examples, along with, in some instances, many orthographic vantage points which are likewise virtual vantage points that do not correspond to any individual capture device 302. In some implementations, all of the vantage points from which image datasets are provided for use in virtual reality data may be virtual vantage points like orthographic vantage points 704 and/or perspective vantage point 706.

In some examples, virtual vantage points such as vantage point 706 may be disposed in a relatively static formation (e.g., a formation related to the formation of capture devices 302, a formation that divides up real-world scene 306 in a structured manner, etc.). In such examples, image data associated with each virtual vantage point may, as a default, be automatically generated as a weighted combination or weighted blend of image data captured by certain capture devices 302. For instance, because vantage point 706 is nearest to vantage point 702-2, if vantage point 706 were implemented as a static vantage point, image data associated with vantage point 706 may generally be generated as a weighted blend that prioritizes data captured from vantage point 702-2 but also uses some data captured from vantage point 702-1 and/or other vantage points 702 (e.g., such as the "40/60" default blend illustrated above in relation to FIG. 5B). As described above, despite whatever default blending of data may be associated with a particular non-aligned vantage point, depictions of recognized pre-modeled objects may be rendered so as to prioritize image data from a preferred vantage point in a way that is not performed for depictions of other types of objects.

In other examples, a virtual vantage point such as vantage point 706 may be implemented as a dynamic (i.e., mobile, non-static) vantage point that is dedicated to providing a view of pre-modeled object 308 even as pre-modeled object 308 moves within real-world scene 306. Specifically, for instance, as capture device 302-1 captures a first image dataset from a location associated with vantage point 702-1 and capture device 302-2 captures a second image dataset from a location associated with vantage point 702-2, system 100 may access the first and second image datasets from capture devices 302-1 and 302-2, respectively. Based on these image datasets, system 100 may then generate a third image dataset representative of a rendered image from a third vantage point that is a dynamic vantage point configured to track pre-modeled object 308 within real-world scene 306 (i.e., follow pre-modeled object 308 as pre-modeled object 308 moves within real-world scene 306) and is associated at the particular time with a third location where no physical capture device 302 is disposed.

Figure 8:
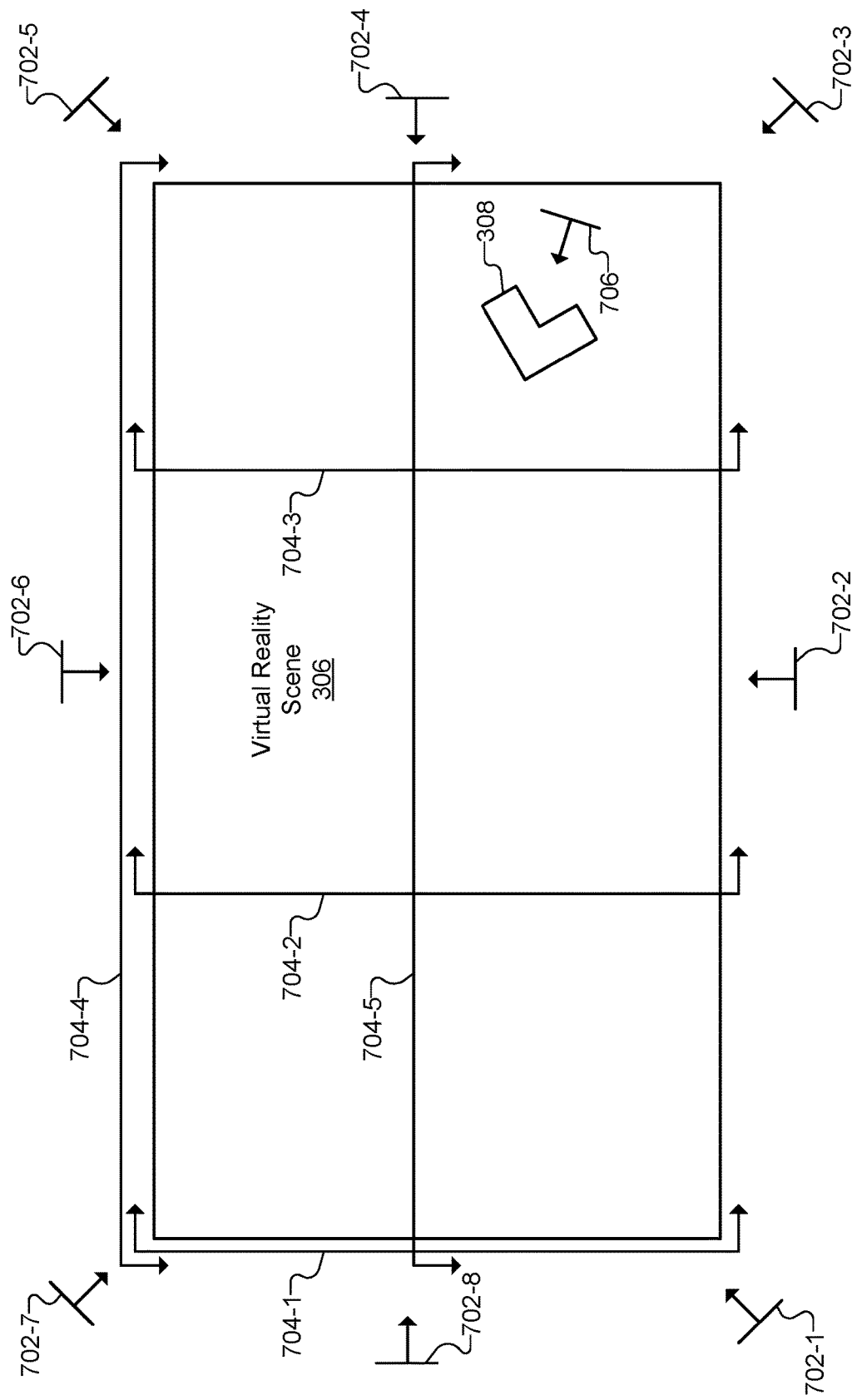

To illustrate, FIG. 8 shows the same exemplary vantage points from which images of real-world scene 300 may be depicted as FIG. 7. However, while perspective vantage points 702 and orthographic vantage points 704 are illustrated to be in the same locations as shown in FIG. 7 (e.g., because these vantage points may be static vantage points configured to remain in a fixed formation), virtual vantage point 706 is shown in a different location than was illustrated in FIG. 7 because it has tracked a movement of pre-modeled object 308. Specifically, as shown in FIG. 8, as pre-modeled object 308 has moved over toward a corner of real-world scene 306 near vantage points 702-3 and 702-4, vantage point 706 has likewise dynamically moved to track pre-modeled object 308 on the front side. For example, if pre-modeled object 308 were implemented as a human face, vantage point 706 may track and follow the face as the person to whom the face belongs moves around real-world scene 306.

While, as mentioned above, static virtual vantage points may be associated with default blends of data captured by particular physical capture devices, dynamic virtual vantage points may be associated with dynamic blends of data as the dynamic virtual vantage points move around in a scene. For example, image datasets associated with virtual vantage point 706 may be rendered based on image data captured from different vantage points 702 as pre-modeled object 308 moves. Specifically, for instance, image datasets associated with vantage point 706 may be generated based on data captured from vantage points 702-1 and 702-2 when pre-modeled object 308 is at the location shown in FIG. 7, while image datasets associated with vantage point 706 may be generated based on vantage points 702-3 and 702-4 when pre-modeled object 308 moves to the new location illustrated in FIG. 8.

Regardless of whether an image dataset representative of a rendered image is generated from a static or a dynamic vantage point, system 100 (e.g., implemented by one of 3D rendering engines 404) may generate the image dataset of the rendered image based on at least two image datasets of captured images, one of which is prioritized over the other, as described above. In other words, system 100 may prioritize image data captured from a preferred vantage point over image data captured from other (non-preferred) vantage points.

FIGS. 9A through 9C illustrate how system 100 may determine which vantage points are to be considered preferred vantage points or non-preferred vantage points with respect to a particular pre-modeled object. More specifically, FIGS. 9A through 9C illustrate aspects of how system 100 may recognize a pre-modeled object within both the first and second captured images, determine respective first and second confidence metrics representative of objective degrees to which system 100 accurately recognizes the pre-modeled object within the respective captured images, and identify a preferred vantage point for the pre-modeled object by determining that one confidence metric is greater than the other confidence metric.

In some examples, the recognizing of a pre-modeled object within a captured image (e.g., the first or second captured images) may include identifying, based on a preconfigured model of the pre-modeled object, a plurality of features characterizing instances of the pre-modeled object. For instance, FIG. 9A illustrates an exemplary preconfigured model 900 of pre-modeled object 308. As illustrated, preconfigured model 900 may be characterized by various standalone features (e.g., particular corners, edges, etc., that, in and of themselves, help characterize pre-modeled object 308) indicated in FIG. 9A by 'X' symbols, as well as various structural features (e.g., spatial or structural relationships between identified standalone features) indicated in FIG. 9A by thin lines connecting the 'X' symbols.

Preconfigured model 900 of pre-modeled object 308 may be implemented as a statistical model defining the plurality of features characterizing various instances of pre-modeled object 308 based on a machine-learning analysis of a plurality of known instances of pre-modeled object 308. For example, preconfigured model 900 may be "pretrained" using machine learning and other similar techniques to analyze a large number (e.g., hundreds or thousands in certain examples) of known instances of pre-modeled object 308 to generate the statistical model prior to employing the statistical model by system 100. It will be understood that, while preconfigured model 900 may be configured to be used in real-time processes (e.g., such that potential instances of pre-modeled object 308 may be fitted to preconfigured model 900 in real time during operation of system 100), the training process by which preconfigured model 900 is created may not be performed in real time, but may be performed previous to operation of system 100. Additionally, in some examples, preconfigured model 900 may continue to be incrementally improved and continuously enhanced during operation of system 100.

The standalone and structural features illustrated in FIG. 9A may be any suitable features that help characterize pre-modeled object 308 to facilitate machine recognition of pre-modeled object 308. For example, if pre-modeled object 308 were a human face (rather than the geometric object shown), standalone features could represent patches of pixels depicting known components of a human face (e.g., eyes, a nose, a mouth, etc.), and structural features may be predefined relationships between where these known components are found on a human face (two eyes relatively close to one another and above a nose and a mouth, etc.). While preconfigured model 900 illustrates a relatively simple example of a pre-modeled object that is relatively straightforward to recognize, it will be understood that preconfigured models for different types of pre-modeled objects may be considerably more complex so as to statistically represent what unifies and connects many non-identical instances of a particular type of object (e.g., what faces of many different people have in common, etc.).

To illustrate how depictions of objects included within captured images may be "fitted" to a preconfigured model such as preconfigured model 900, FIGS. 9B and 9C illustrate captured images 902 (i.e., captured images 902-1 and 902-2) within which system 100 may recognize pre-modeled object 308 to a particular degree of confidence. As shown, each of captured images 902 include a respective depiction 904 (i.e., depictions 904-1 and 904-2) of pre-modeled object 308. However, because captured images 902 are each captured from different vantage points with respect to real-world scene 306, pre-modeled object 308 looks different in each of captured images 902. Specifically, captured image 902-1 in FIG. 9B may represent an image captured by capture device 302-1 from vantage point 702-1, while captured image 902-2 in FIG. 9C may represent an image captured by capture device 302-2 from vantage point 702-2.

System 100 may recognize pre-modeled object 308 within both captured images 902 by matching standalone and/or structural features found in depictions 904 to the features of the statistical model of preconfigured model 900. This process may be referred to as "fitting" an object depiction to the preconfigured model, and may be performed in real time during operation of system 100. Because it may require a relatively large amount of processing to perform fitting operations for each frame captured by each capture device, certain shortcuts may be employed in some examples to produce an efficient and streamlined fitting process. For example, in some implementations in which an image dataset of a captured image 902 is included in a plurality of image datasets representative of a sequence of captured images, system 100 may base the analysis of the captured image 902 on a previous analysis of a previous image dataset representative of a previous captured image that immediately precedes the captured image 902 in the sequence of captured images.

For example, if it has been determined that a captured image immediately preceding captured image 902-1 includes a depiction of pre-modeled object 308 on the right half of the image, it may be considered likely that depiction 904-1 of pre-modeled object 308 will similarly be found in captured image 902-1 in a similar part of captured image 902-1. As such, the recognizing of pre-modeled object within captured image 902-1 may include determining, based on a portion of the previous image dataset that represents the pre-modeled object, a portion of the image dataset of captured image 902-1 likely to represent pre-modeled object 308 (e.g., a portion including the right half of captured image 902-1 in one example). The recognizing may further include analyzing that portion of the image dataset (e.g., the portion representative of the right half of captured image 902-1) likely to represent the pre-modeled object to determine if pre-modeled object 308 is found within the portion of captured image 902-1. Moreover, the recognizing may include determining that pre-modeled object 308 is not found within a remainder of the image dataset outside the portion of the image dataset (e.g., within a remainder of the image dataset that represents the left half of image 902-1) without analyzing the remainder of the first image dataset. In other words, system 100 may only analyze the right half of image 902-1 and not the left half to recognize pre-modeled object 308 based on a previous recognition of pre-modeled object 308 in a preceding captured image in the sequence due to an assumption that no object moves significantly from frame to frame in the image sequence.

Regardless of which portions of captured images 902 are analyzed to search for an instance of pre-modeled object 308 that fits to preconfigured model 900, system 100 may be considered to have "recognized" pre-modeled object 308 within captured images 902 when a threshold number of features identified in depictions 904 can be successfully matched up to corresponding features in preconfigured model 900. Specifically, for instance, the recognizing of pre-modeled object 308 within captured image 902-1 may include identifying a plurality of features characterizing instances of pre-modeled object 308 based on preconfigured model 900 of pre-modeled object 308, determining that a number of features from the plurality of features characterizing the instances of the pre-modeled object are present within captured image 902-1, and determining that this number of features present is greater than a predetermined threshold number of features. For example, it may be determined that an object is recognized if a predetermined threshold number of features (e.g., at least 10 features, at least 30% of the total number of features modeled in preconfigured model 900, etc.) can be identified in the image.

Even if pre-modeled object 308 can be recognized within both captured images 902, the recognition may be more certain (i.e., may be associated with a higher level of confidence) for one captured image 902 than the other. For example, even if the predetermined threshold number of features is identified in both captured images, a larger number of features may be identified in one captured image than the other, indicating a higher objective degree to which system 100 accurately recognizes the pre-modeled object within that captured image. For example, as shown, while most of the features illustrated for preconfigured model 900 in FIG. 9A are shown to have been identified on depiction 904-1 in captured image 902-1, even more of the features are shown to be identified on depiction 904-2 in captured image 902-2. This is because depiction 904-2 is a more close-up, straight-on depiction of pre-modeled object 308 due to being captured from vantage point 702-2 rather than being captured from vantage point 702-1 like depiction 904-1.

Confidence metrics representative of the objective degree to which system 100 accurately recognizes pre-modeled object 308 within each captured image 902 may be determined and assigned in any manner as may serve a particular implementation. For example, the determining of a confidence metric may be performed based exclusively or in part on the number of features that are determined to be present within the captured image (e.g., an overall number of matched features, a percentage of matched features from the total number of features expected for a perfect match, etc.). Additionally or alternatively, the determining of the confidence metric may be performed based on other aspects such as how large a depiction is relative to the total size of the captured image (e.g., representing how close-up a view the vantage point provides), how precisely the identified features resemble corresponding features of the preconfigured model, or any other suitable objective measures of the degree to which a depiction of an object fits the preconfigured model.

FIG. 10 illustrates exemplary confidence metric data 1000 for pre-modeled objects recognized in captured images such as captured images 902. Specifically, the data may include sections 1002 (e.g., sections 1002-1, 1002-2, etc.) associated with various pre-modeled objects (e.g., "Object 1," "Object 2," etc.) that system 100 may be trying to recognize within images captured by each of the capture devices. For example, section 1002-1 for "Object 1" may include confidence metric data associated with pre-modeled object 308, while other sections 1002 for other objects may include confidence metric data associated with other pre-modeled objects that system 100 may be configured to try to recognize.

Within each section 1002, confidence metric data for each capture device 302 (e.g., device "1" representing capture device 302-1, device "2" representing capture device 302-2, etc.) may be included. For example, as shown in FIG. 10, system 100 may recognize pre-modeled object 308 with a confidence metric of 81% based on data captured by capture device 302-1, a confidence metric of 96% based on data captured by capture device 302-2, a confidence metric of 47% based on data captured by capture device 302-3, and may not recognize pre-modeled object 308 at all based on data captured by the remaining capture devices 302 (i.e., capture devices 302-4 through 302-8). While confidence metric data is illustrated to be represented using percentages and is formatted in a particular way in FIG. 10, it will be understood that confidence metric data may be structured, organized, and represented in any manner as may serve a particular implementation.

Once confidence metric data has been determined for each capture device and/or each captured image, confidence metrics may be compared to determine which capture device 302 (and corresponding captured image) has a preferred vantage point for pre-modeled object 308. This determination may be performed in any suitable way. For instance, system 100 may determine which confidence metric is the greatest for each object (e.g., determining, for Object 1, that the confidence metric associated with device 2 is greater than the confidence metric associated with any other device).

In some examples, the greatest confidence metric may not be easily determinable. For example, while the confidence metric illustrated in FIG. 10 may represent confidence metrics of each capture device 302 when pre-modeled object 308 is located in the position illustrated in FIG. 7, these confidence metrics may change significantly when pre-modeled object 308 moves to the position illustrated in FIG. 8. For instance, in this position, devices 3 and 4 (at vantage points 702-3 and 702-4, respectively) may be associated with approximately equal confidence metrics, while other devices may not recognize pre-modeled object 308 at all. In this type of situation, it may be necessary to determine which vantage point is preferred without a confidence metric clearly being greater than the others (e.g., to "break a tie" between similar or identical confidence metrics).

This determination may be made in any suitable manner. For example, one capture device may be randomly determined to have the "greater" confidence metric, a default capture device (e.g., the higher-numbered capture device) may be determined to have the "greater" confidence metric, or the like. As another possibility, additional forms of machine recognition may be performed to better determine which capture device has a preferred vantage point for pre-modeled object 308. For example, if pre-modeled object 308 were a human face, system 100 may be configured not only to recognize that a face is present within each captured image, but to further attempt to recognize who the face belongs to, what facial expression is present on the face, certain textural details of the face, or the like. These additional forms of recognition may similarly be associated with confidence metrics that may be compared to help break the tie between the confidence metrics associated with confidence metric data 1000 or for other purposes as may serve a particular implementation.

Returning to FIG. 2, once scene reconstruction system 204 (e.g., including 3D rendering engines each implementing system 100) determines a preferred vantage point for a particular pre-modeled object (e.g., based on which confidence metric is the greatest for that pre-modeled object), scene reconstruction system 204 may render depictions of that pre-modeled object in image datasets representative of rendered images (e.g., rendered images 502-2 and 502-4, color data image 412-2, etc.) by prioritizing data captured from the preferred vantage point in any of the ways described above. Additionally, data captured from the preferred vantage point may be prioritized in other ways such as by what image data atlas systems 206 include or emphasize in the virtual reality data they provide to media player devices 212.

Figure 11:
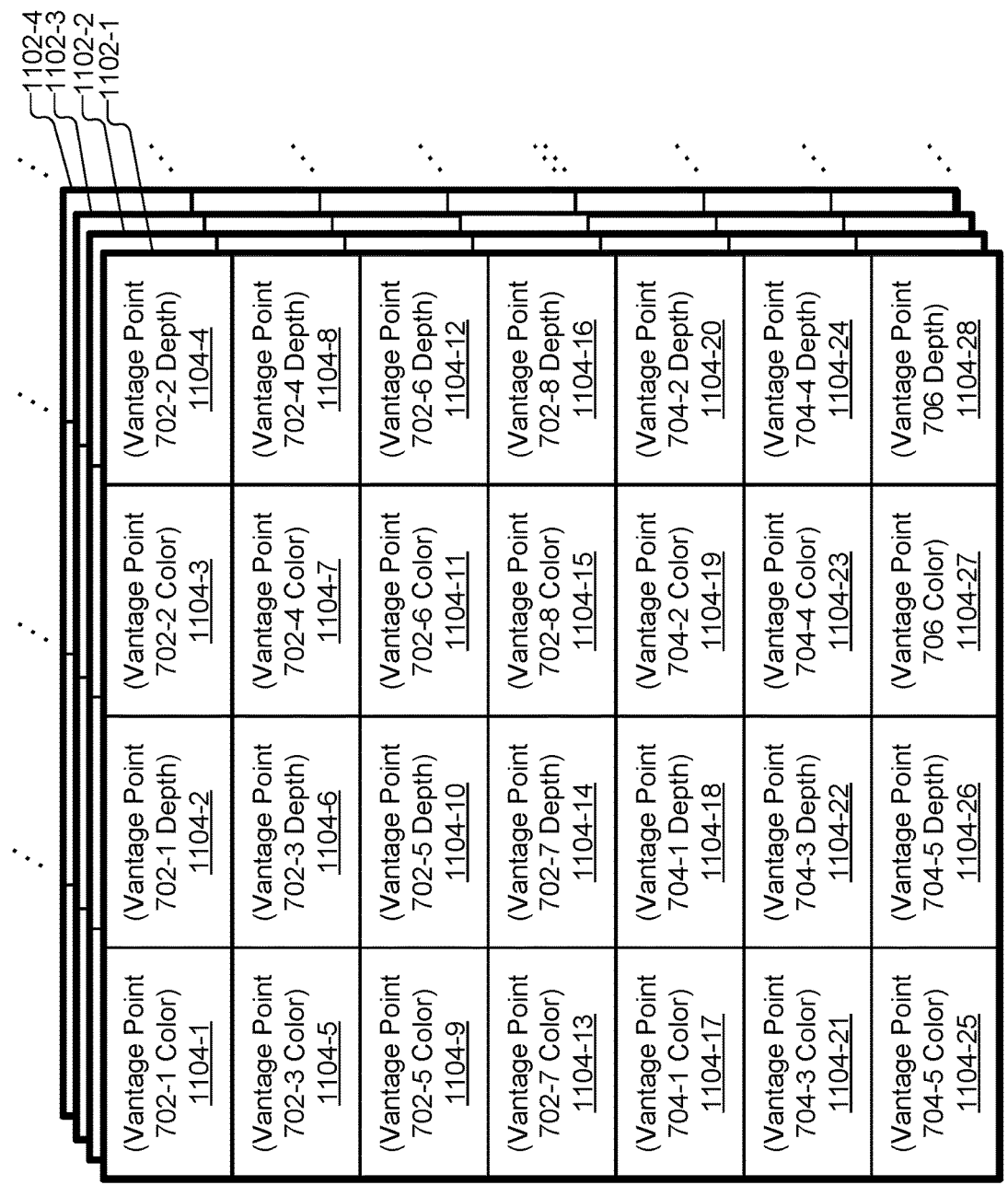
FIG. 11 illustrates an exemplary full atlas frame sequence according to principles described herein.

To illustrate, FIG. 11 shows an exemplary representation of full atlas frame sequence 218 that may be output from one of atlas systems 206 and that includes a plurality of full atlas frames 1102 (e.g., full atlas frames 1102-1 through 1102-4 and additional frames not shown). In FIG. 11, each full atlas frame 1102 in full atlas frame sequence 218 is shown to include a plurality of images 1104 (e.g., images 1104-1 through 1104-28). Specifically, as labeled in FIG. 11, images 1104 in this example include a color data image and a depth data image captured from each of vantage points 702-1 through 702-8, 704-1 through 704-5, and 706.

Atlas frames (e.g., also referred to as texture atlases) may combine a plurality of images (e.g., also referred to as atlas tiles, patches, sprites, etc.) that have certain attributes in common (e.g., each depicts the same virtual reality world, each is to be transmitted to the same destination, etc.) for convenience and efficiency in transmitting, storing, and processing the images. In the example of FIG. 11, each image 1104 is shown to be a uniform size and to be partitioned into unique rectangular areas. However, it will be understood that, in certain examples, atlas tiles may take irregular shapes and may be combined together in a manner that is less regular and/or partitioned than the example of FIG. 11 (e.g., such that images are pushed together to maximize image space on each frame).

Each image 1104 on each full atlas frame 1102 may be part of a different image sequence consisting of the image 1104 and corresponding images on other full atlas frames 1102 in full atlas frame sequence 218. For example, image 1104-1 may be part of an image sequence consisting of image 1104-1 on full atlas frame 1102-1, a corresponding image included on full atlas frame 1102-2, a corresponding image included on full atlas frame 1102-3, and so forth. Accordingly, just as each full atlas frame 1102 includes, in this example, twenty-eight different images 1104, it will be understood that full atlas frame sequence 218 includes twenty-eight different image sequences.

In some examples, an atlas frame sequence may be configured to include all of the color data image sequences and all of the depth data image sequences associated with all of the vantage points that may be available for a particular virtual reality world. For instance, full atlas frame sequence 218 may be understood to be an example of such an atlas frame sequence for this example, which is why it is referred to as a "full" atlas frame sequence. Referring back to FIG. 2, configuration 200 illustrates that scene reconstruction system 204 may be configured to generate such a full atlas frame sequence to distribute the available image sequences to various atlas systems 206 and, eventually, to various media player devices 212. However, in examples where many frame sequences from many vantage points may be available for rendering a particular virtual reality world, it may not be desirable for each media player device 212 to receive all of the possible image sequences. For instance, if a user 214 desires to experience real-world scene 306 near the vicinity of pre-modeled object 308, it may be determined that his or her media player device 212 may be able to make use of a relatively large amount of detail from vantage points such as vantage points 702-1, 702-2, 702-6, 702-7, 702-8, and 706. However, the media player device 212 used by this user 214 may not have use for data representative of other parts of real-world scene 306. As a result, it may not be necessary or desirable to provide this media player device 212 with data representing real-world scene 306 as depicted from other vantage points.

To this end, atlas systems 206 may be employed within virtual reality provider system 208 to receive full atlas frame sequence 218 and to prepare particular combination subsets of image sequences from full atlas frame sequence 218 that may be desirable to send to different media player devices 212, which each may be providing virtual reality experiences to users 214 in different parts of real-world scene 306. As shown in FIG. 2, such subsets of image sequences may be included in a plurality of different partial atlas frame sequences 220 (e.g., partial atlas frame sequences 220-1 through 220-M), and may be provided to whichever media player devices 212 may request them. For example, the plurality of partial atlas frame sequences 220 may each include a different subset of the image sequences in the plurality of image sequences included in full atlas frame sequence 218.

Figure 12:
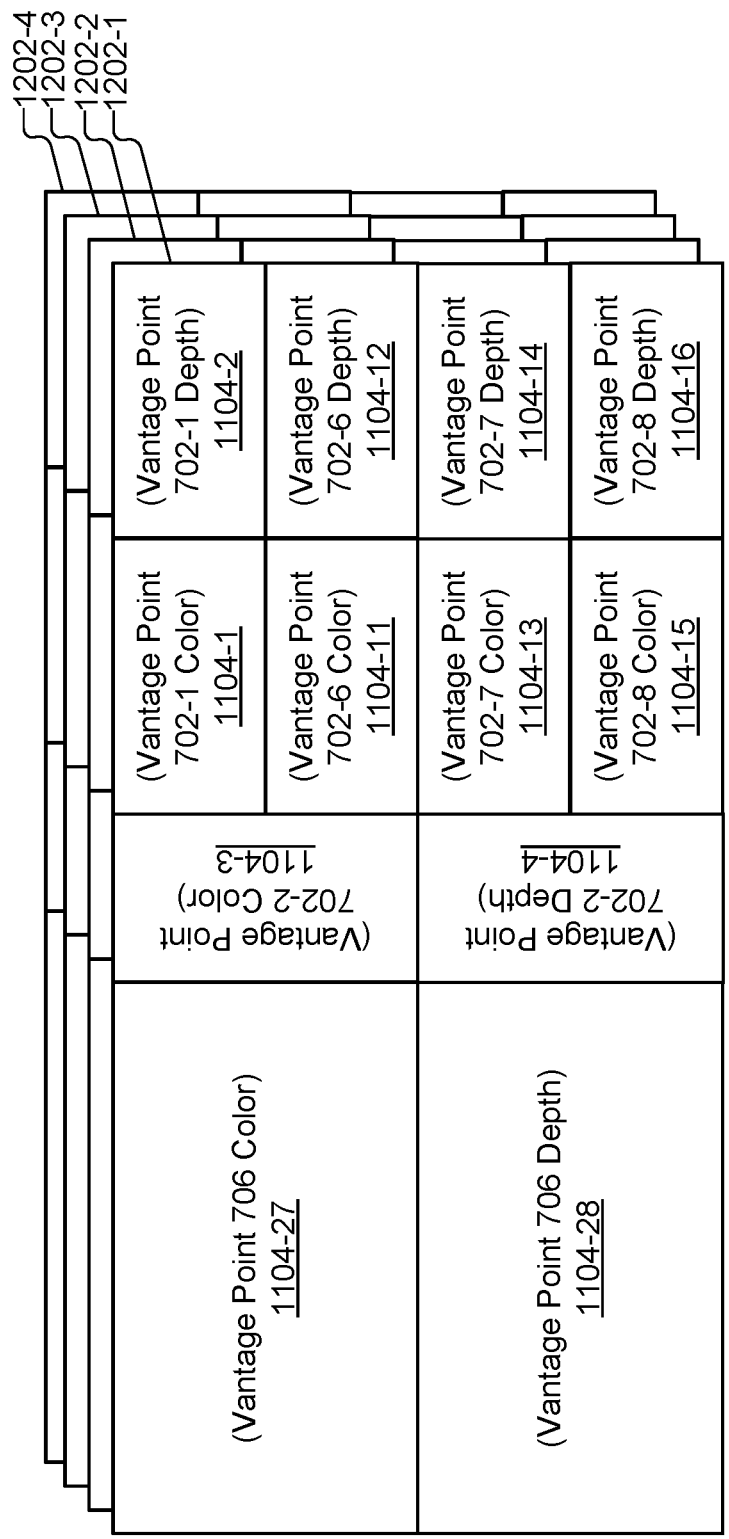
FIG. 12 illustrates an exemplary partial atlas frame sequence including a subset of image sequences from the full atlas frame sequence of FIG. 11 according to principles described herein.

FIG. 12 shows an exemplary partial atlas frame sequence 220 including a subset of image sequences selected from full atlas frame sequence 218. Partial atlas frame sequence 220 may represent any of partial atlas frame sequences 220-1 through 220-M shown in configuration 200. As shown, partial atlas frame sequence 220 includes a plurality of partial atlas frames 1202 (e.g., partial atlas frames 1202-1 through 1202-4 and additional frames not explicitly shown), each of which contains a subset of images 1104 from full atlas frames 1102 in FIG. 11. As indicated by the different sizes of images 1104 as depicted in FIG. 12, different versions of images 1104 (e.g., having different resolutions or other differences in quality) may be included within each partial atlas frame 1202.

Specifically, as shown, full-resolution versions of images 1104-27 and 1104-28 (i.e., rendered color and depth images associated with virtual vantage point 706) are included on each partial atlas frame 1202 along with medium-resolution versions of images 1104-3 and 1104-4 (i.e., captured color and depth images associated with vantage point 702-2) and low-resolution versions of images 1104-1 and 1104-2 (i.e., captured color and depth images associated with vantage point 702-1), 1104-11 and 1104-12 (i.e., captured color and depth images associated with vantage point 702-6), 1104-13 and 1104-14 (i.e., captured color and depth images associated with vantage point 702-7), and 1104-1 and 1104-2 (i.e., captured color and depth images associated with vantage point 702-8).

The images selected for inclusion within each partial atlas frame 1202 and the quality level (e.g., resolution) with which they are represented may be determined by a particular atlas system 206 in any suitable way and based on any factors as may serve a particular implementation. For instance, as mentioned above, an atlas system 206 may generate partial atlas frame sequence 220 by prioritizing certain image datasets over others based on which vantage points have been determined to be preferred vantage points for particular pre-modeled objects. As one example, an atlas system 206 generating partial atlas frame sequence 220 may prioritize image datasets representative of images 1104-27, 1104-28 over other image datasets representative of other images such as images 1104-1 and 1104-2 based on a determination that the confidence metric for capture device 302-2 is greater than the confidence metric for capture device 302-1 for pre-modeled object 308.

As with the prioritizing of data described above as part of the rendering process (e.g., prioritizing data for a color blending technique or the like), the prioritizing of certain image datasets over others in the preparation of virtual reality data such as partial atlas frame sequence 220 may be performed in various ways. For instance, as shown in FIG. 12, the prioritizing of the image datasets associated with vantage point 706 over the image datasets associated with vantage point 702-1 may be performed by selecting both the image datasets for inclusion within the subset of image datasets included within partial atlas frame sequence 220, but including a higher quality (e.g., higher resolution) version of the image dataset associated with vantage point 706 and a lower quality (e.g., lower resolution) version of the image dataset associated with vantage point 702-1. In other examples, the prioritizing may be performed by selecting the image dataset associated with vantage point 706 but not selecting the image dataset associated with vantage point 702-1 for inclusion within the subset of image datasets included within partial atlas frame sequence 220.

Returning to FIG. 2, configuration 200 illustrates that each partial atlas frame sequence 220 may be transmitted by way of network 210 to any media player devices 212 that may request it. Partial atlas frame sequences 220 may form part or all of an overall virtual reality dataset provided by virtual reality provider system 208 to the media player devices 212 to allow users 214 to have desired virtual reality experiences associated with different parts of real-world scene 306. For example, atlas system 206-1 may generate a virtual reality dataset including partial atlas frame sequence 220-1 as a stream or other suitable dataset, and may provide the virtual reality dataset to media player devices 212-1 and 214-3, while atlas system 206-2 generates a virtual reality dataset including partial atlas frame sequence 220-2 and provides the virtual reality dataset to media player device 212-2, and so forth. In this way, each media player device 212 may access a set of image sequences that will allow that media player device 212 to present a particular part of a virtual reality world corresponding to real-world scene 306 (e.g., a part that the respective user 214 of the media player device 212 currently wishes to view) with an appropriate level of detail while remaining efficient by minimizing the amount of unneeded detail provided to each media player device.

In FIG. 2, atlas systems 206 are shown to provide virtual reality datasets including partial atlas frame sequences 220 directly to media player devices 212 by way of network 210. Network 210 may include a provider-specific wired or wireless network (e.g., a cable or satellite carrier network or a mobile telephone network), the Internet, a wide area network, a content delivery network, or any other suitable network. Data may flow between virtual reality provider system 208 on the provider side of configuration 200 and media player devices 212 on the client side of configuration 200 using any communication technologies, devices, media, and protocols as may serve a particular implementation.

Media player devices 212 may be used by users 214 to access and experience virtual reality data generated and provided by virtual reality provider system 208. For example, media player devices 212 may be configured to generate (e.g., based on the color and depth image sequences included within partial atlas frame sequences 220) a 3D representation of real-world scene 306 to be experienced by the respective user 214 from an arbitrary experience location (e.g., a dynamically selectable location selected by the user and corresponding to an arbitrary virtual location within real-world scene 306). To this end, media player devices 212 may be configured to render image datasets representative of rendered images depicting real-world scene 306 from arbitrary vantage points dynamically selected by users 214 in a similar way to how the image datasets representative of the rendered images were described above to be rendered by 3D rendering engines 404. As such, respective implementations of system 100 may similarly be included within some or all of media player devices 212 to accurately represent pre-modeled objects within the rendered images in any of the ways described herein, and so as to provide any of the benefits described herein.

To this end, each of media player devices 212 may be implemented by any device capable of presenting a field of view of a virtual reality world (e.g., representing real-world scene 306) and detecting user input from a user 214 to dynamically update the content of the virtual reality world presented within the field of view as the user 214 experiences the virtual reality world. For example, an exemplary media player device 212 may be implemented as a head-mounted virtual reality device (e.g., a virtual reality gaming device) that includes a head-mounted display screen. In other examples, other form factors such as a personal computer device (e.g., a desktop computer, laptop computer, etc.), a mobile or wireless device (e.g., a smartphone, a tablet device, etc., possibly mounted to the head of user 214 by means of a head mount apparatus), or another suitable device or configuration of devices may be used.

Figure 13:
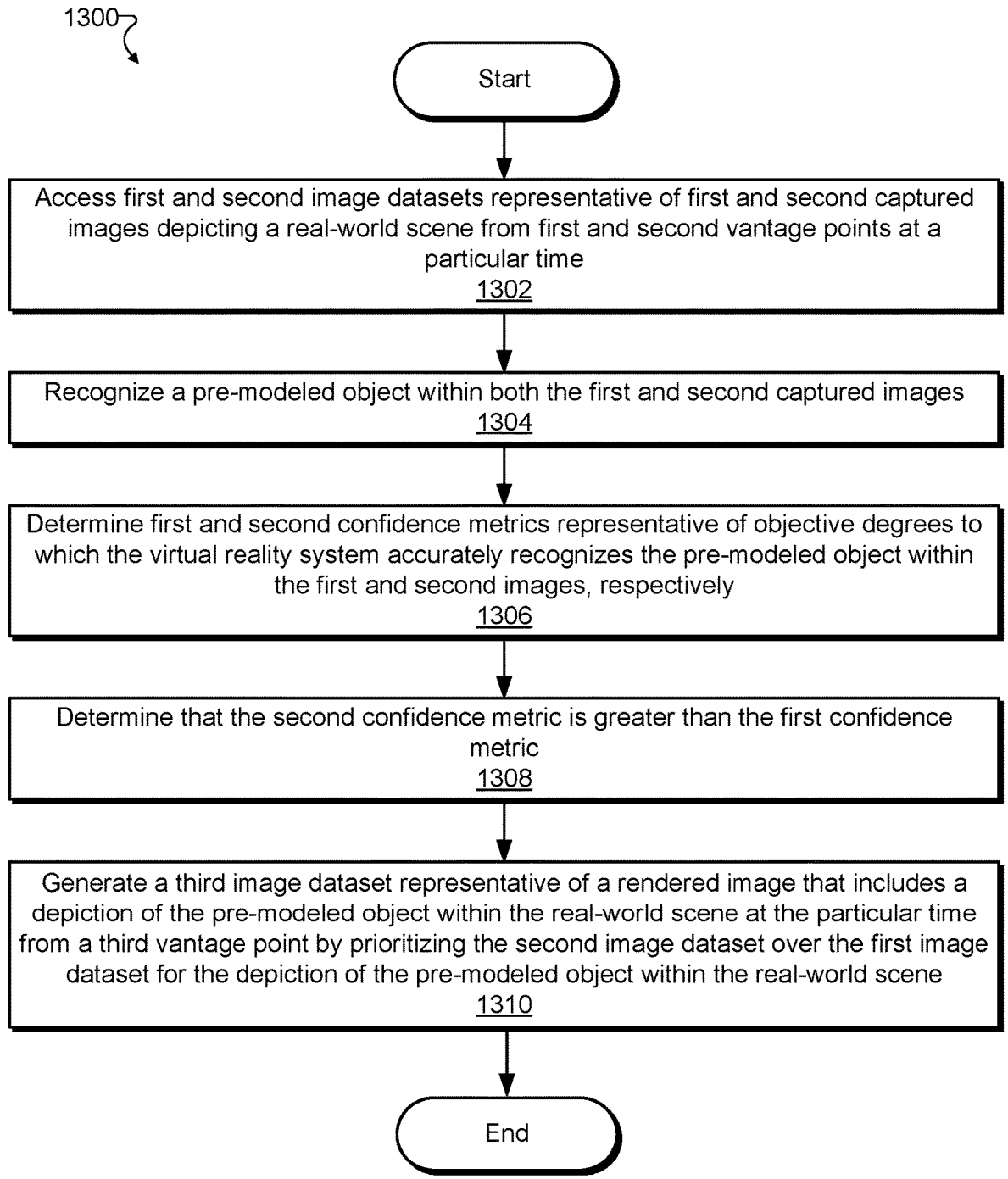
FIGS. 13 and 14 illustrate exemplary methods for accurately representing a pre-modeled object within virtual reality data according to principles described herein.

FIG. 13 illustrates an exemplary method 1300 for accurately representing a pre-modeled object within virtual reality data. While FIG. 13 illustrates exemplary operations according to one embodiment, other embodiments may omit, add to, reorder, and/or modify any of the operations shown in FIG. 13. One or more of the operations shown in FIG. 13 may be performed by system 100 and/or by any implementation thereof.

In operation 1302, a virtual reality system may access a first image dataset and a second image dataset. In particular, the first image dataset may be representative of a first captured image depicting a real-world scene from a first vantage point at a particular time. Similarly, the second image dataset may be representative of a second captured image depicting the real-world scene from a second vantage point distinct from the first vantage point at the particular time. Operation 1302 may be performed in any of the ways described herein.

In operation 1304, the virtual reality system may recognize a pre-modeled object within both the first and second captured images. For example, the virtual reality system may recognize the pre-modeled object based on the first and second image datasets accessed in operation 1302. Operation 1304 may be performed in any of the ways described herein.

In operation 1306, the virtual reality system may determine a first confidence metric and a second confidence metric. For example, the first confidence metric may be representative of an objective degree to which the virtual reality system accurately recognizes the pre-modeled object within the first captured image. Similarly, the second confidence metric may be representative of an objective degree to which the virtual reality system accurately recognizes the pre-modeled object within the second captured image. Operation 1306 may be performed in any of the ways described herein.

In operation 1308, the virtual reality system may determine that the second confidence metric is greater than the first confidence metric. Operation 1308 may be performed in any of the ways described herein.

In operation 1310, the virtual reality system may generate a third image dataset representative of a rendered image that includes a depiction of the pre-modeled object within the real-world scene at the particular time from a third vantage point distinct from the first and second vantage points. Specifically, the virtual reality system may generate the third image dataset based on the first and second image datasets accessed in operation 1302. In some examples, the generating of operation 1310 may comprise (i.e., be performed by) prioritizing the second image dataset over the first image dataset for the depiction of the pre-modeled object within the real-world scene. For instance, the prioritizing may be performed based on the determining in operation 1308 that the second confidence metric is greater than the first confidence metric. Operation 1310 may be performed in any of the ways described herein.

Figure 14:
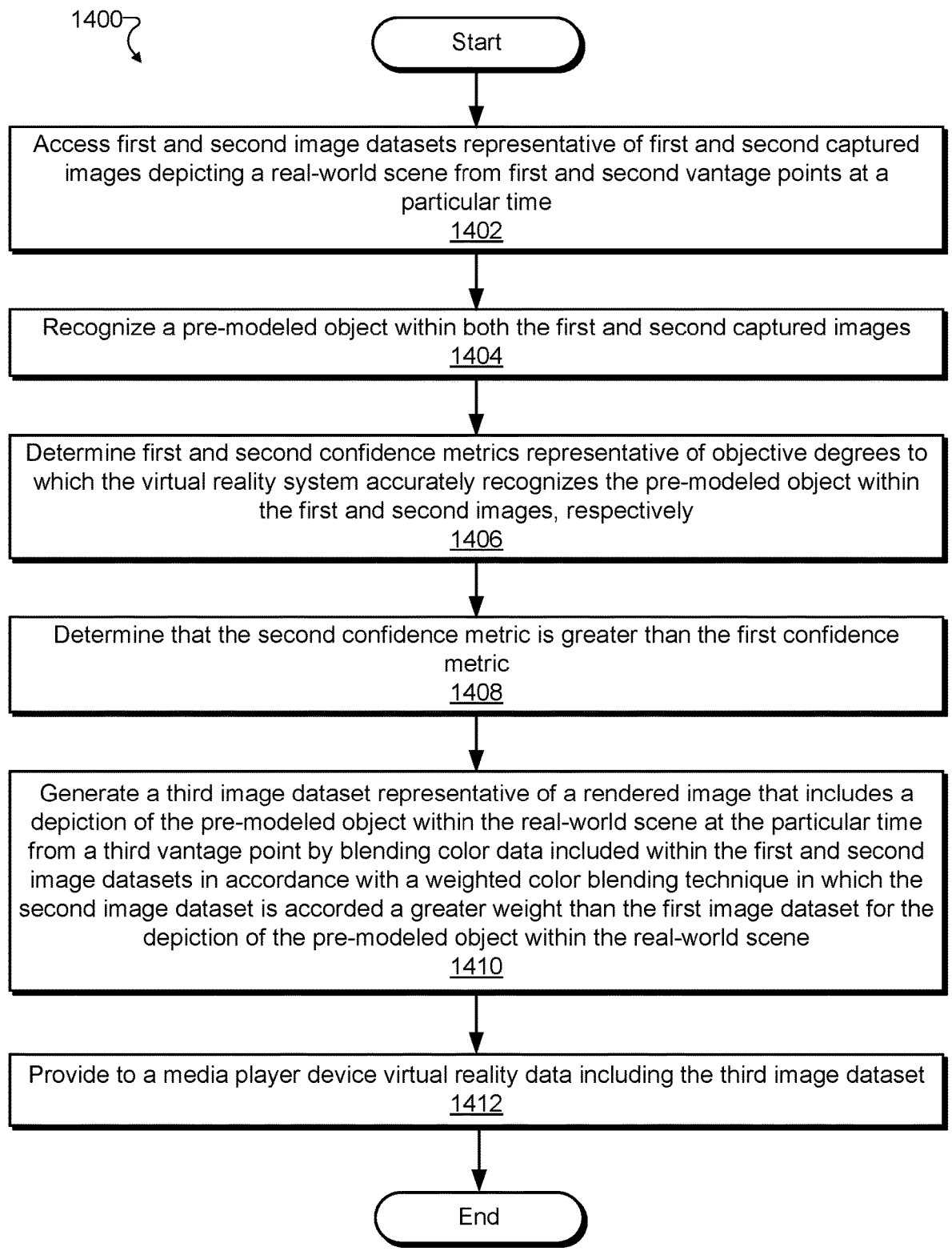

FIG. 14 illustrates an exemplary method 1400 for accurately representing a pre-modeled object within virtual reality data. While FIG. 14 illustrates exemplary operations according to one embodiment, other embodiments may omit, add to, reorder, and/or modify any of the operations shown in FIG. 14. One or more of the operations shown in FIG. 14 may be performed by system 100 and/or by any implementation thereof. In particular, while the operations of method 1300 may be performed by an implementation of system 100 included within a virtual reality provider system (e.g., within 3D rendering engines within a scene reconstruction system included in the virtual reality provider system) or by a client device (e.g., within a media player device), the operations of method 1400 may be performed by an implementation of system 100 that is specifically implemented by a virtual reality provider system.

In operation 1402, a virtual reality provider system may access a first image dataset and a second image dataset. In particular, the first image dataset may be representative of a first captured image depicting a real-world scene from a first vantage point at a particular time. Similarly, the second image dataset may be representative of a second captured image depicting the real-world scene from a second vantage point distinct from the first vantage point at the particular time. Operation 1402 may be performed in any of the ways described herein.

In operation 1404, the virtual reality provider system may recognize a pre-modeled object within both the first and second captured images. For example, the virtual reality provider system may recognize the pre-modeled object based on the first and second image datasets accessed in operation 1402. Operation 1404 may be performed in any of the ways described herein.

In operation 1406, the virtual reality provider system may determine a first confidence metric and a second confidence metric. For example, the first confidence metric may be representative of an objective degree to which the virtual reality provider system accurately recognizes the pre-modeled object within the first captured image. Similarly, the second confidence metric may be representative of an objective degree to which the virtual reality provider system accurately recognizes the pre-modeled object within the second captured image. Operation 1406 may be performed in any of the ways described herein.

In operation 1408, the virtual reality provider system may determine that the second confidence metric is greater than the first confidence metric. Operation 1408 may be performed in any of the ways described herein.

In operation 1410, the virtual reality provider system may generate a third image dataset representative of a rendered image that includes a depiction of the pre-modeled object within the real-world scene at the particular time from a third vantage point distinct from the first and second vantage points. Specifically, the virtual reality provider system may generate the third image dataset based on the first and second image datasets. In some examples, the generating of operation 1410 may comprise (i.e., be performed by) blending color data included within the first and second image datasets accessed in operation 1402 in accordance with a weighted color blending technique in which the second image dataset is accorded a greater weight than the first image dataset for the depiction of the pre-modeled object within the real-world scene. For instance, the blending of the color data performed in accordance with the weighted color blending technique may be performed based on the determining in operation 1408 that the second confidence metric is greater than the first confidence metric. Operation 1410 may be performed in any of the ways described herein.

In operation 1412, the virtual reality provider system may provide virtual reality data to a media player device over a network. For example, the virtual reality provider system may provide virtual reality data that includes the third image dataset generated by way of the blending, in operation 1410, of the color data in accordance with the weighted color blending technique in which the second image dataset is accorded the greater weight than the first image dataset for the depiction of the pre-modeled object within the real-world scene. Operation 1412 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 15:
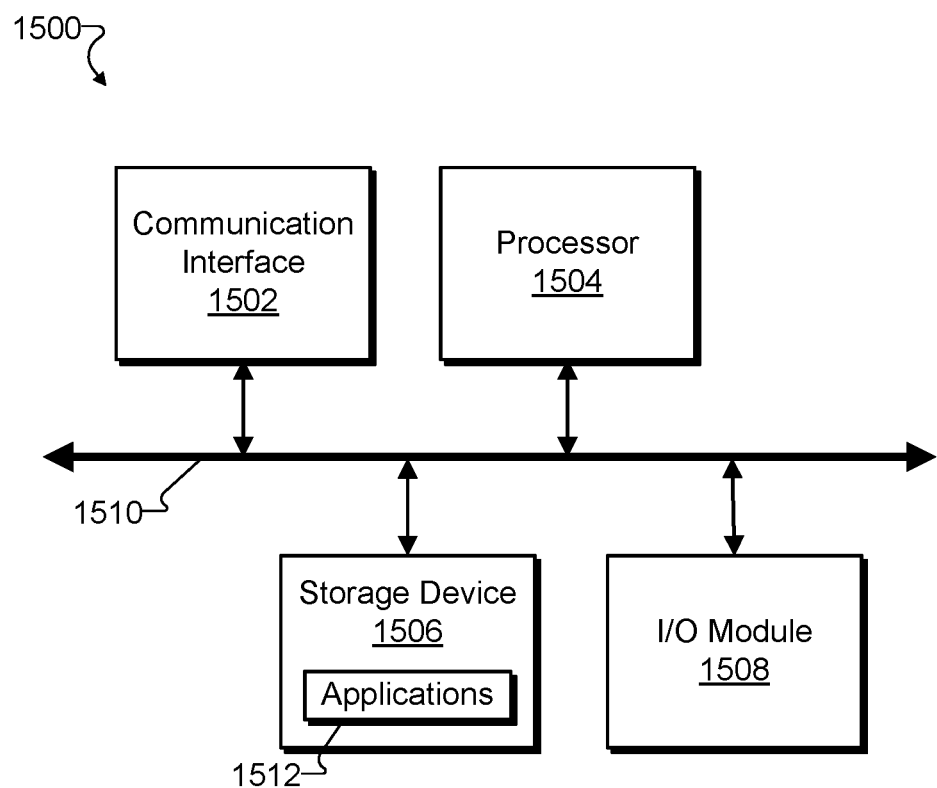
FIG. 15 illustrates an exemplary computing device according to principles described herein.

FIG. 15 illustrates an exemplary computing device 1500 that may be specifically configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit (e.g., a central processing unit and/or a graphics processing unit) capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1506. For example, data representative of one or more executable applications 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. One or more I/O modules may be used to receive input for a single virtual reality experience. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more operations or functions associated with facilities 102 through 106 of system 100 (see FIG. 1). Likewise, storage facility 108 may be implemented by or within storage device 1506.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a virtual reality system, a first confidence metric representing an objective degree to which a pre-modeled object is recognized within a first captured image depicting a scene from a first vantage point;

determining, by the virtual reality system, a second confidence metric representing an objective degree to which the pre-modeled object is recognized within a second captured image depicting the scene from a second vantage point distinct from the first vantage point; and generating, by the virtual reality system, a rendered image that includes a depiction of the pre-modeled object and a depiction of an additional object within the scene from a third vantage point distinct from the first and second vantage points, wherein:

the depiction of the pre-modeled object and the depiction of the additional object are generated based on data from the first and second captured images, the data is prioritized according to relative magnitudes of the first and second confidence metrics for the depiction of the pre-modeled object, and the data is not prioritized according to the relative magnitudes of the first and second confidence metrics for the depiction of the additional object.

2. The method of claim 1, wherein:

the data from the first and second captured images that is not prioritized for the depiction of the additional object is an equally weighted blend of image data from the first and second captured images; and the data from the first and second captured images that is prioritized for the depiction of the pre-modeled object is an unequally weighted blend of image data from the first and second captured images that places more emphasis on image data from the second captured image than on image data from the first captured image.

3. The method of claim 1, wherein:

the data from the first and second captured images that is not prioritized for the depiction of the additional object is an unequally weighted blend of image data from the first and second captured images that, as a default, places more emphasis on image data from the second captured image than on image data from the first captured image; and the data from the first and second captured images that is prioritized for the depiction of the pre-modeled object is also an unequally weighted blend of image data from the first and second captured images that places an even higher emphasis than the default on the image data from the second captured image than on the image data from the first captured image.

4. The method of claim 1, further comprising recognizing, by the virtual reality system based on the data from the first and second captured images, the pre-modeled object within the first and second captured images;

wherein the determining of the first confidence metric is based on the recognizing of the pre-modeled object within the first captured image and the determining of the second confidence metric is based on the recognizing of the pre-modeled object within the second captured image.

5. The method of claim 4, wherein:

the recognizing of the pre-modeled object within the first captured image includes identifying, based on a preconfigured model of the pre-modeled object, a plurality of features characterizing instances of the pre-modeled object, and determining that a number of features from the plurality of features characterizing the instances of the pre-modeled object are present within the first captured image, the number of features greater than a predetermined threshold number of features; and the determining of the first confidence metric representative of the objective degree to which the pre-modeled object is recognized within the first captured image is performed based on the number of features that are determined to be present within the first captured image.

6. The method of claim 4, wherein:

the recognizing of the pre-modeled object within the first captured image includes identifying, based on a preconfigured model of the pre-modeled object, a plurality of features characterizing instances of the pre-modeled object; and the preconfigured model of the pre-modeled object is a statistical model defining the plurality of features characterizing the instances of the pre-modeled object based on a machine-learning analysis of a plurality of known instances of the pre-modeled object.

7. The method of claim 1, wherein:

a plurality of capture devices disposed at different locations with respect to the scene is configured to capture images depicting the scene, the plurality of capture devices including a first capture device that captures the first captured image and a second capture device that captures the second captured image;

the first vantage point is associated with a first location where the first capture device is located;

the second vantage point is associated with a second location where the second capture device is located; and the third vantage point is a dynamic vantage point that is configured to track the pre-modeled object within the scene and is associated at a particular time with a third location where no capture device is disposed.

8. The method of claim 1, wherein the pre-modeled object is associated with at least one of a body of a human being, a human face, or a product logo.

9. The method of claim 1, wherein the scene depicted by the first and second captured images is a real-world scene captured by physical capture devices disposed at different locations with respect to the real-world scene.

10. A system comprising:

a memory storing instructions; and a processor communicatively coupled to the memory and configured to execute the instructions to:

determine a first confidence metric representing an objective degree to which a pre-modeled object is recognized within a first captured image depicting a scene from a first vantage point;

determine a second confidence metric representing an objective degree to which the pre-modeled object is recognized within a second captured image depicting the scene from a second vantage point distinct from the first vantage point; and generate a rendered image that includes a depiction of the pre-modeled object and a depiction of an additional object within the scene from a third vantage point distinct from the first and second vantage points, wherein:

the depiction of the pre-modeled object and the depiction of the additional object are generated based on data from the first and second captured images, the data is prioritized according to relative magnitudes of the first and second confidence metrics for the depiction of the pre-modeled object, and the data is not prioritized according to the relative magnitudes of the first and second confidence metrics for the depiction of the additional object.

11. The system of claim 10, wherein:
the data from the first and second captured images that is not prioritized for the depiction of the additional object is an equally weighted blend of image data from the first and second captured images; and
the data from the first and second captured images that is prioritized for the depiction of the pre-modeled object is an unequally weighted blend of image data from the first and second captured images that places more emphasis on image data from the second captured image than on image data from the first captured image.

12. The system of claim 10, wherein:
the data from the first and second captured images that is not prioritized for the depiction of the additional object is an unequally weighted blend of image data from the first and second captured images that, as a default, places more emphasis on image data from the second captured image than on image data from the first captured image; and
the data from the first and second captured images that is prioritized for the depiction of the pre-modeled object is also an unequally weighted blend of image data from the first and second captured images that places an even higher emphasis than the default on the image data from the second captured image than on the image data from the first captured image.

13. The system of claim 10, wherein:
the processor is further configured to execute the instructions to recognize, based on the data from the first and second captured images, the pre-modeled object within the first and second captured images; and
the determining of the first confidence metric is based on the recognizing of the pre-modeled object within the first captured image and the determining of the second confidence metric is based on the recognizing of the pre-modeled object within the second captured image.

14. The system of claim 13, wherein:
the recognizing of the pre-modeled object within the first captured image includes
identifying, based on a preconfigured model of the pre-modeled object, a plurality of features characterizing instances of the pre-modeled object, and
determining that a number of features from the plurality of features characterizing the instances of the pre-modeled object are present within the first captured image, the number of features greater than a predetermined threshold number of features; and
the determining of the first confidence metric representative of the objective degree to which the pre-modeled object is recognized within the first captured image is performed based on the number of features that are determined to be present within the first captured image.

15. The system of claim 13, wherein:
the recognizing of the pre-modeled object within the first captured image includes identifying, based on a preconfigured model of the pre-modeled object, a plurality of features characterizing instances of the pre-modeled object; and
the preconfigured model of the pre-modeled object is a statistical model defining the plurality of features characterizing the instances of the pre-modeled object based on a machine-learning analysis of a plurality of known instances of the pre-modeled object.

16. The system of claim 10, wherein:
a plurality of capture devices disposed at different locations with respect to the scene is configured to capture images depicting the scene, the plurality of capture devices including a first capture device that captures the first captured image and a second capture device that captures the second captured image;
the first vantage point is associated with a first location where the first capture device is located;
the second vantage point is associated with a second location where the second capture device is located; and
the third vantage point is a dynamic vantage point that is configured to track the pre-modeled object within the scene and is associated at a particular time with a third location where no capture device is disposed.

17. The system of claim 10, wherein the pre-modeled object is associated with at least one of a body of a human being, a human face, or a product logo.

18. A non-transitory computer-readable medium storing instructions that, when executed, direct a processor of a computing device to:
determine a first confidence metric representing an objective degree to which a pre-modeled object is recognized within a first captured image depicting a scene from a first vantage point;
determine a second confidence metric representing an objective degree to which the pre-modeled object is recognized within a second captured image depicting the scene from a second vantage point distinct from the first vantage point; and
generate a rendered image that includes a depiction of the pre-modeled object and a depiction of an additional object within the scene from a third vantage point distinct from the first and second vantage points, wherein:
the depiction of the pre-modeled object and the depiction of the additional object are generated based on data from the first and second captured images,
the data is prioritized according to relative magnitudes of the first and second confidence metrics for the depiction of the pre-modeled object, and
the data is not prioritized according to the relative magnitudes of the first and second confidence metrics for the depiction of the additional object.

19. The non-transitory computer-readable medium of claim 18, wherein:
the data from the first and second captured images that is not prioritized for the depiction of the additional object is an equally weighted blend of image data from the first and second captured images; and
the data from the first and second captured images that is prioritized for the depiction of the pre-modeled object is an unequally weighted blend of image data from the first and second captured images that places more emphasis on image data from the second captured image than on image data from the first captured image.

20. The non-transitory computer-readable medium of claim 18, wherein:
the data from the first and second captured images that is not prioritized for the depiction of the additional object is an unequally weighted blend of image data from the first and second captured images that, as a default, places more emphasis on image data from the second captured image than on image data from the first captured image; and the data from the first and second captured images that is prioritized for the depiction of the pre-modeled object is also an unequally weighted blend of image data from the first and second captured images that places an even higher emphasis than the default on the image data from the second captured image than on the image data from the first captured image.

* * * * *